United States Patent
Iyer et al.

(10) Patent No.: US 9,280,464 B2
(45) Date of Patent: Mar. 8, 2016

(54) SYSTEM AND METHOD FOR SIMULTANEOUSLY STORING AND READING DATA FROM A MEMORY SYSTEM

(71) Applicant: Cisco Technology, Inc., San Jose, CA (US)

(72) Inventors: Sundar Iyer, Palo Alto, CA (US); Shang-Tse Chuang, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/730,696

(22) Filed: Jun. 4, 2015

(65) Prior Publication Data

US 2015/0339227 A1    Nov. 26, 2015

Related U.S. Application Data

(63) Continuation of application No. 14/487,083, filed on Sep. 15, 2014, now Pat. No. 9,063,876, which is a continuation of application No. 13/865,997, filed on Apr. 18, 2013, now Pat. No. 8,838,934, which is a continuation of application No. 12/584,645, filed on Sep. 8, 2009, now Pat. No. 8,433,880.

(60) Provisional application No. 61/161,025, filed on Mar. 17, 2009.

(51) Int. Cl.
| | |
|---|---|
| *G06F 12/00* | (2006.01) |
| *G06F 13/00* | (2006.01) |
| *G06F 12/02* | (2006.01) |
| *G06F 12/06* | (2006.01) |

(52) U.S. Cl.
CPC ............ *G06F 12/0292* (2013.01); *G06F 12/06* (2013.01); *G06F 2212/1024* (2013.01); *G06F 2212/152* (2013.01); *G06F 2212/502* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 4,725,945 | A | 2/1988 | Kronstadt et al. |
| 5,835,941 | A | 11/1998 | Pawlowski |
| 5,860,141 | A | 1/1999 | Washington et al. |
| 6,189,073 | B1 | 2/2001 | Pawlowski |
| 6,378,032 | B1 | 4/2002 | Robertson |

(Continued)

FOREIGN PATENT DOCUMENTS

CN    101262405 A    9/2008

OTHER PUBLICATIONS

English translation of Office Action in counterpart Chinese Application No. 201080063971.0, mailed Nov. 24, 2014, 5 pages.

*Primary Examiner* — Sean D Rossiter
(74) *Attorney, Agent, or Firm* — Edell, Shapiro & Finnan, LLC

(57) ABSTRACT

A system and method for providing high-speed memory operations is disclosed. The technique uses virtualization of memory space to map a virtual address space to a larger physical address space wherein no memory bank conflicts will occur. The larger physical address space is used to prevent memory bank conflicts from occurring by moving the virtualized memory addresses of data being written to memory to a different location in physical memory that will eliminate a memory bank conflict. This allows the memory system to both store and read data in the same cycle with no conflicts.

16 Claims, 26 Drawing Sheets

(56) References Cited

U.S. PATENT DOCUMENTS

| | | |
|---|---|---|
| 6,404,691 B1 | 6/2002 | Fujishima et al. |
| 6,446,157 B1 | 9/2002 | McGehearty et al. |
| 6,622,225 B1 | 9/2003 | Kessler et al. |
| 6,801,980 B2 | 10/2004 | Ji et al. |
| 6,948,028 B2 | 9/2005 | Ji et al. |
| 7,047,385 B1 | 5/2006 | Bhattacharya et al. |
| 7,203,794 B2 | 4/2007 | Ji et al. |
| 7,739,460 B1 | 6/2010 | Carr |
| 7,827,372 B2 | 11/2010 | Bink et al. |
| 2002/0056022 A1 | 5/2002 | Leung |
| 2004/0093458 A1 | 5/2004 | Kanno et al. |
| 2004/0103250 A1 | 5/2004 | Alsup |
| 2004/0143710 A1 | 7/2004 | Walmsley |
| 2004/0143720 A1 | 7/2004 | Mansell et al. |
| 2005/0091465 A1 | 4/2005 | Andreev et al. |
| 2006/0129741 A1 | 6/2006 | Hillier et al. |
| 2006/0190678 A1 | 8/2006 | Butler et al. |
| 2007/0233959 A1 | 10/2007 | Hotta et al. |
| 2008/0082755 A1 | 4/2008 | Kornegay et al. |
| 2008/0115043 A1 | 5/2008 | Shimizume et al. |
| 2008/0133876 A1 | 6/2008 | Kwon et al. |
| 2008/0162798 A1 | 7/2008 | Lofgren et al. |
| 2008/0183958 A1 | 7/2008 | Cheriton |
| 2009/0077329 A1 | 3/2009 | Wood et al. |
| 2009/0182944 A1 | 7/2009 | Comparan et al. |
| 2009/0254731 A1 | 10/2009 | Maheshwari et al. |
| 2013/0121075 A1 | 5/2013 | Hutchison et al. |

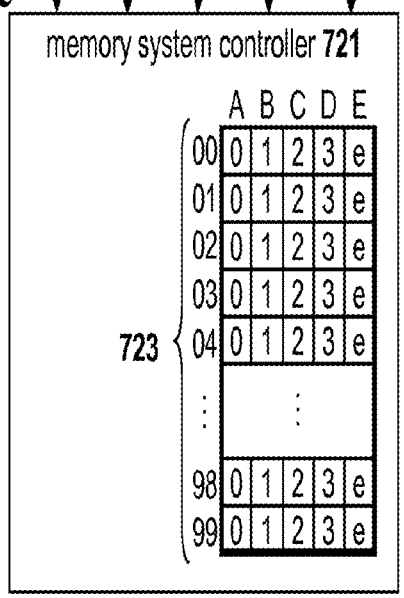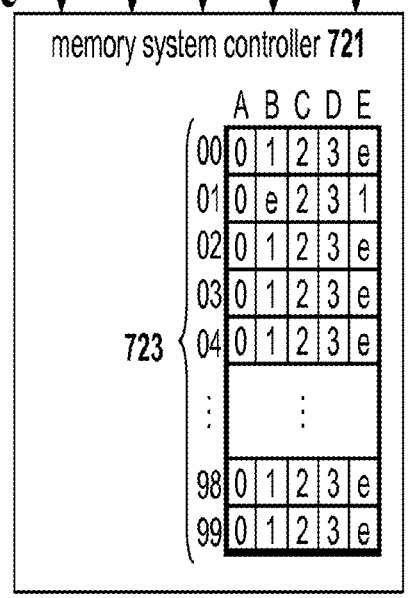
Figure 7A
Figure 7B

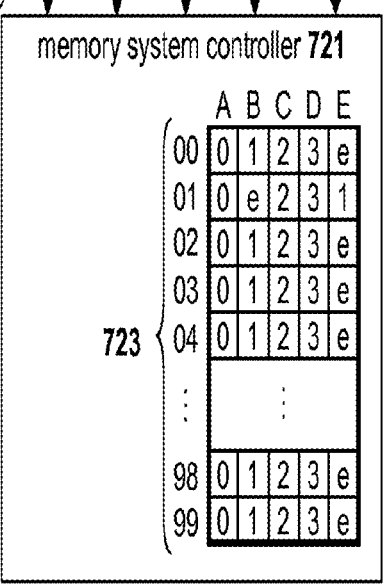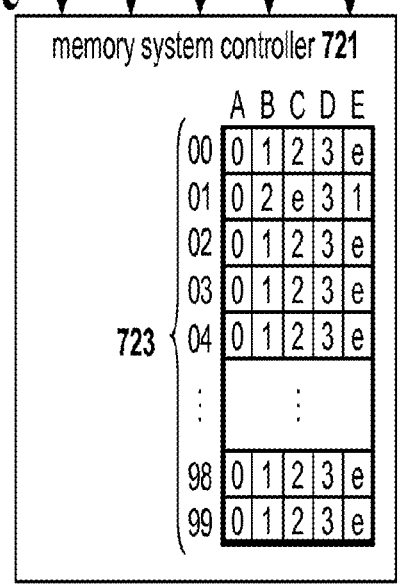

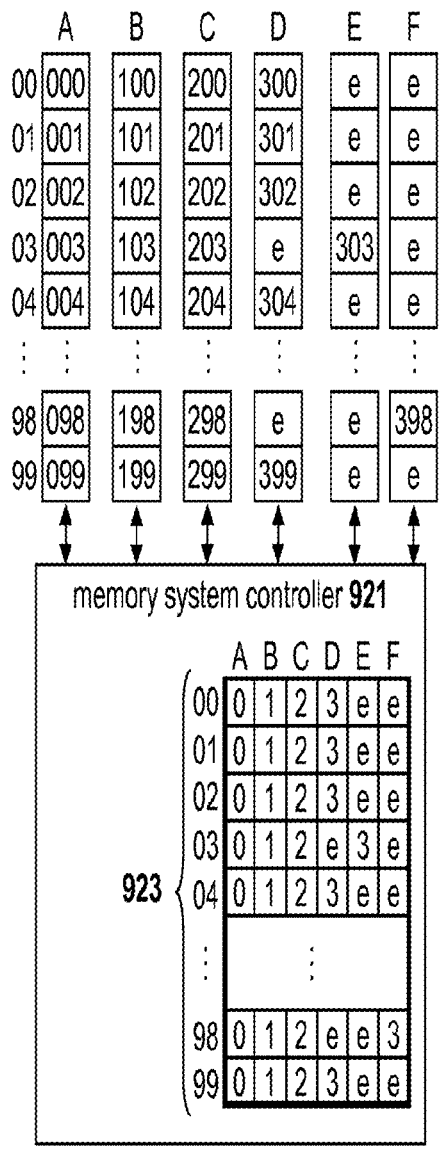
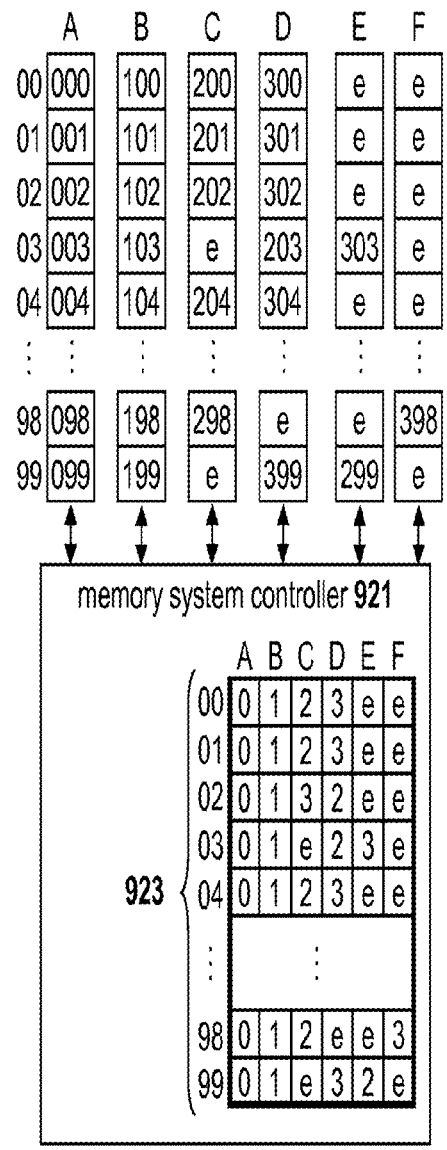
Figure 9C
Figure 9D

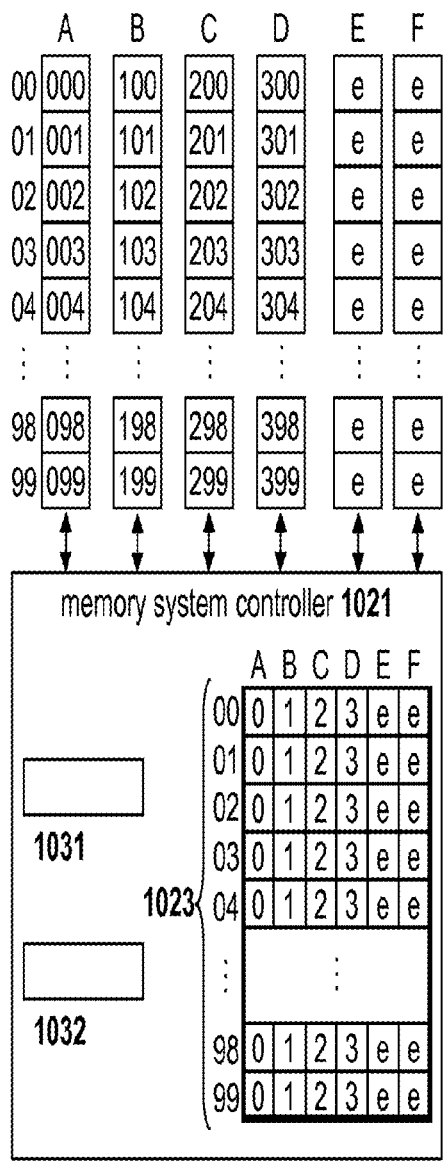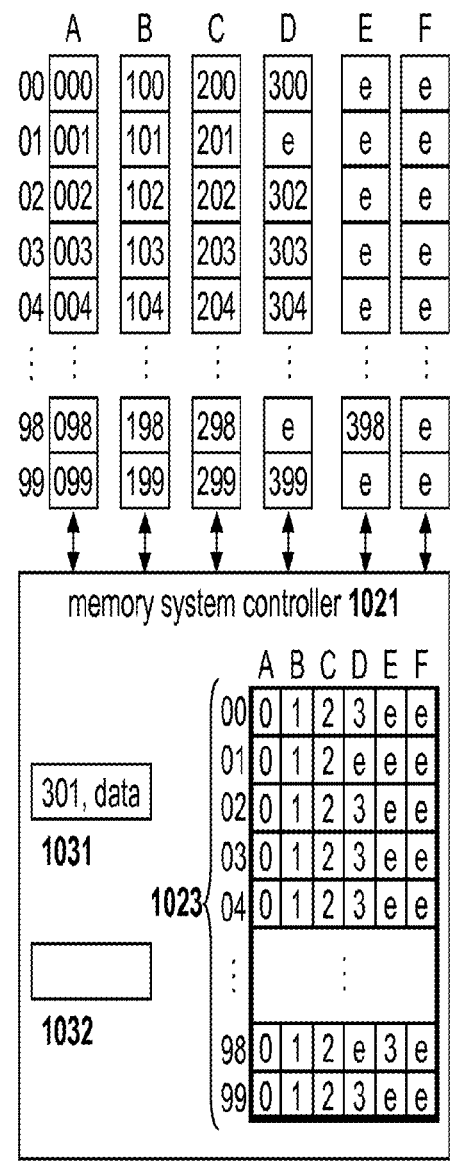
Figure 10A
Figure 10B

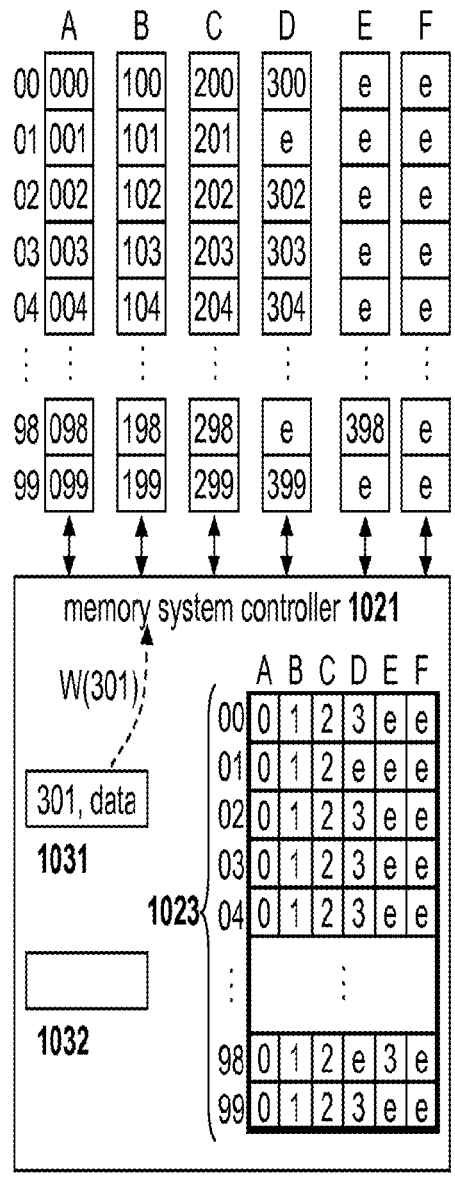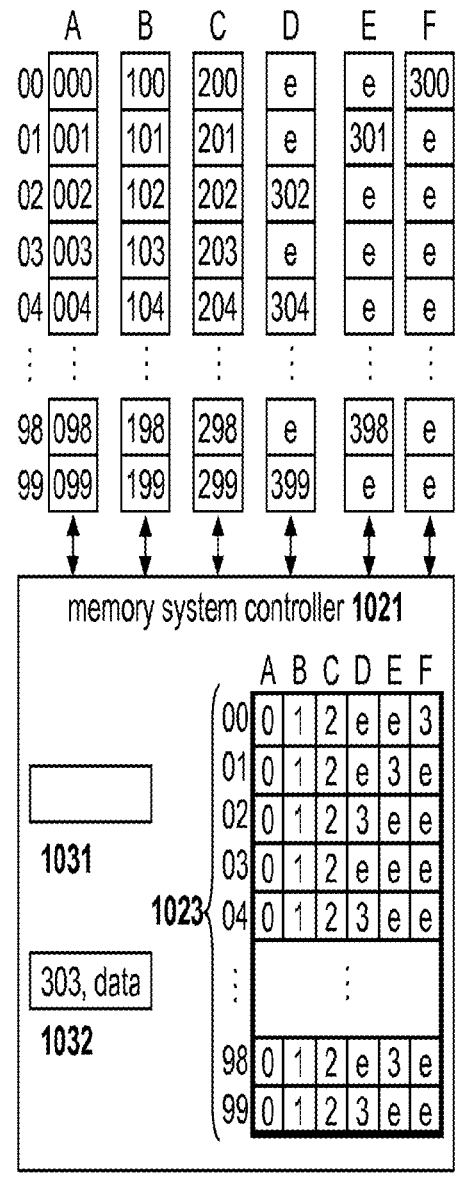
Figure 10C
Figure 10D

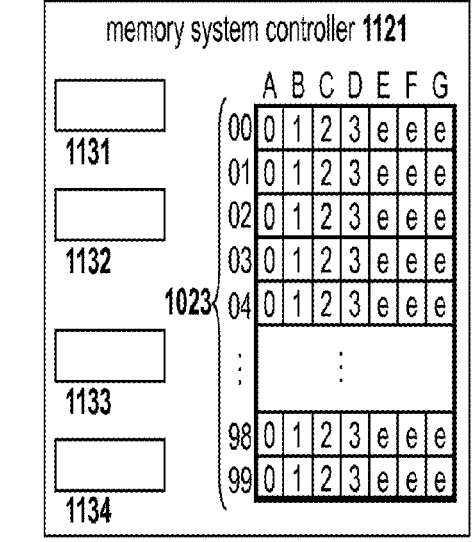
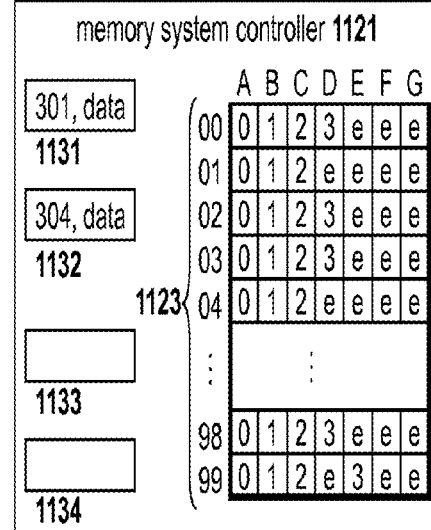
Figure 11A
Figure 11B

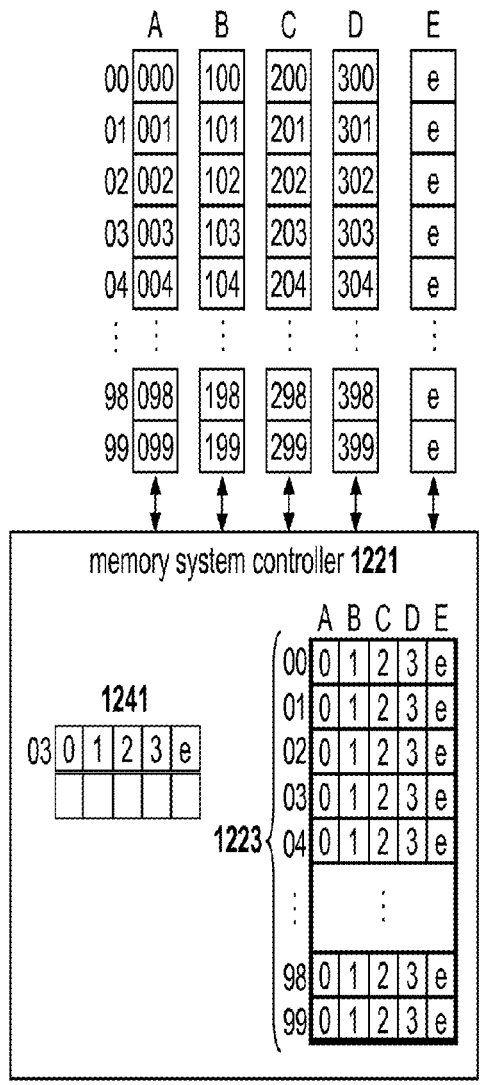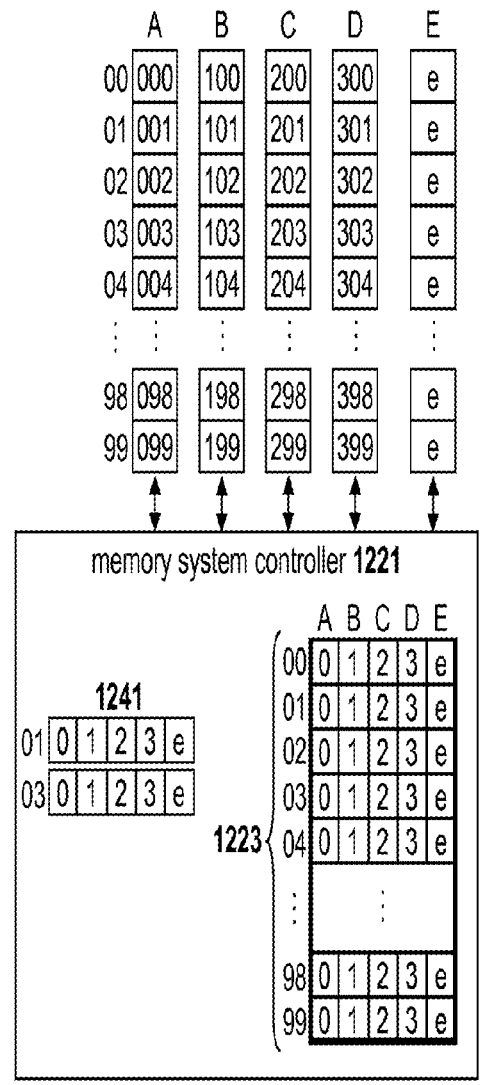
Figure 12C
Figure 12D

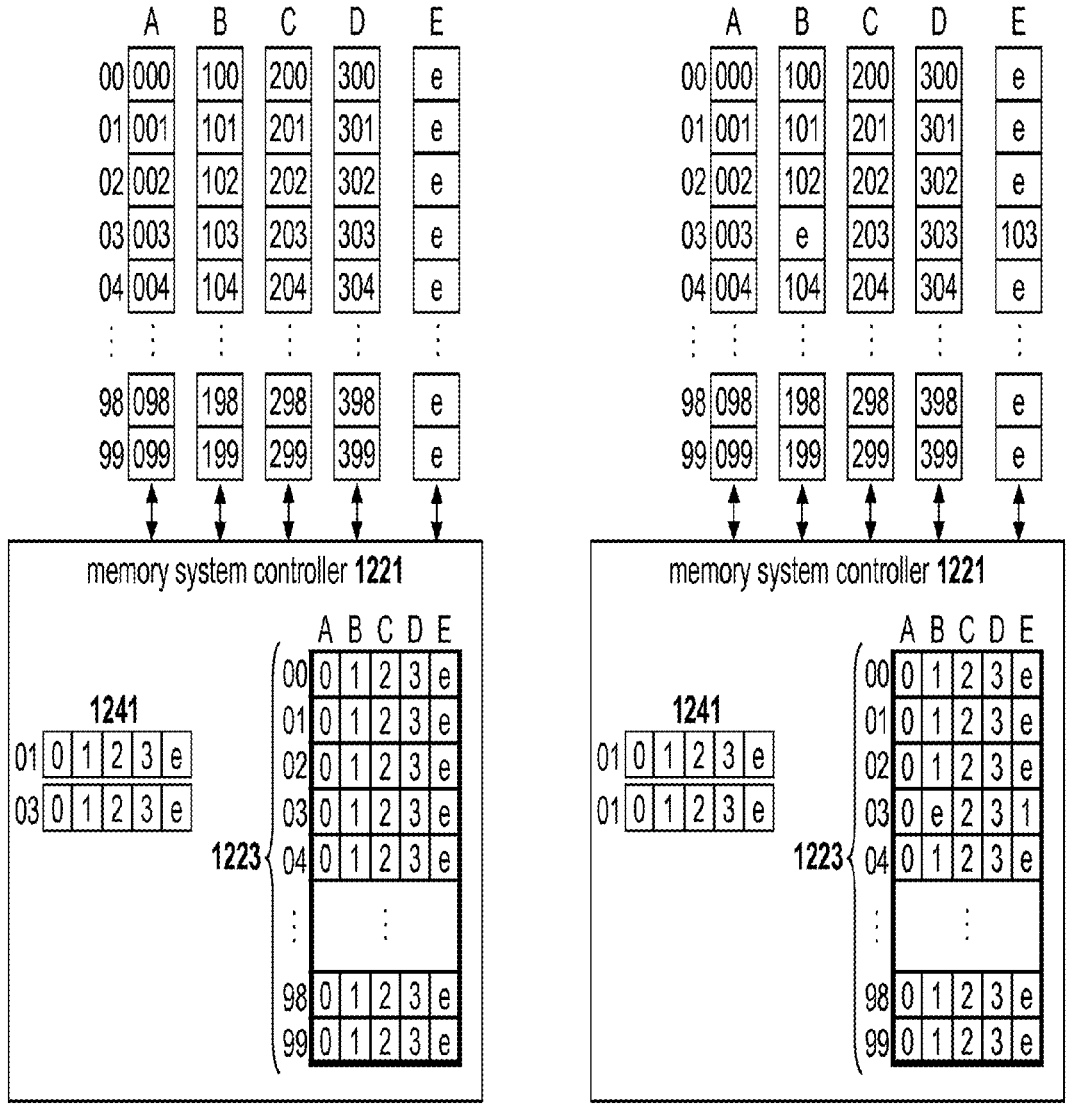

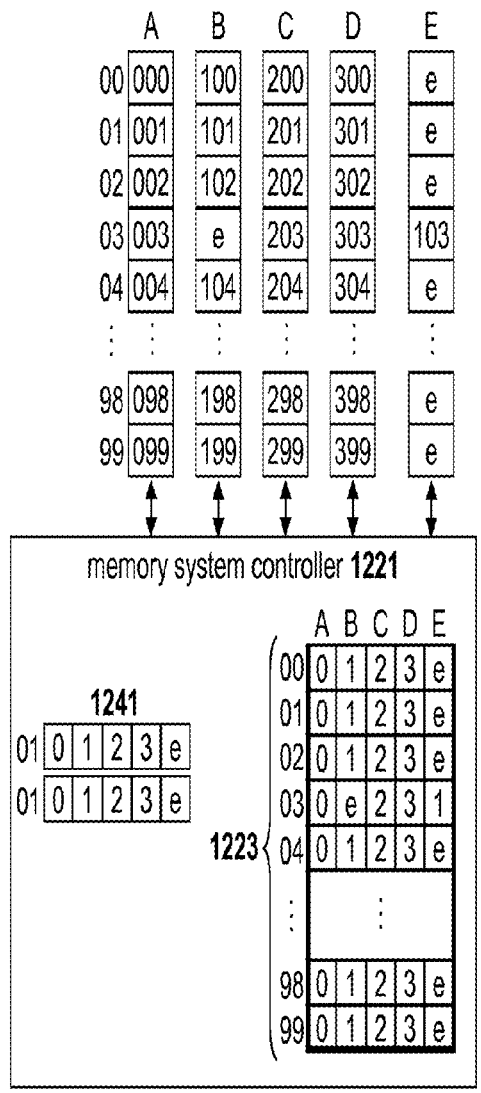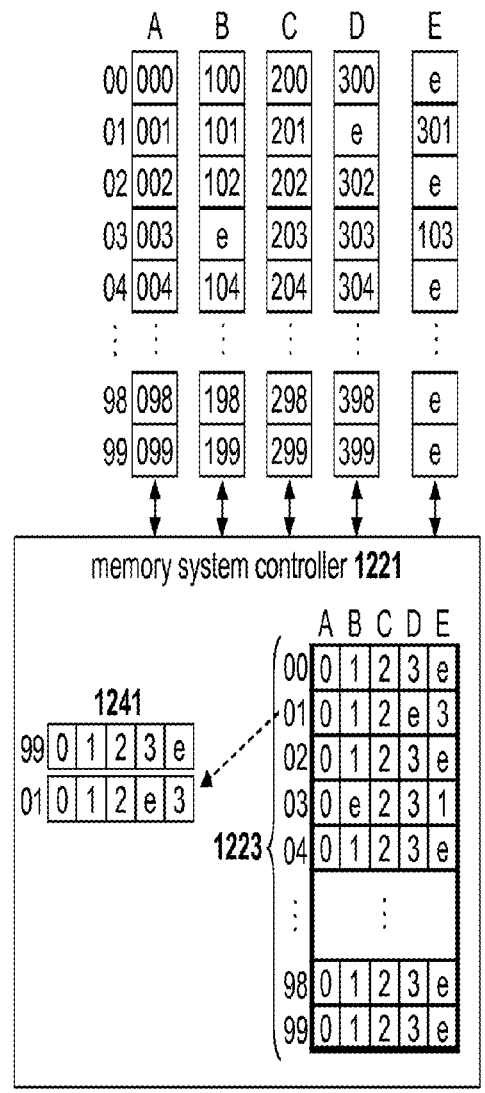
Figure 12G
Figure 12H

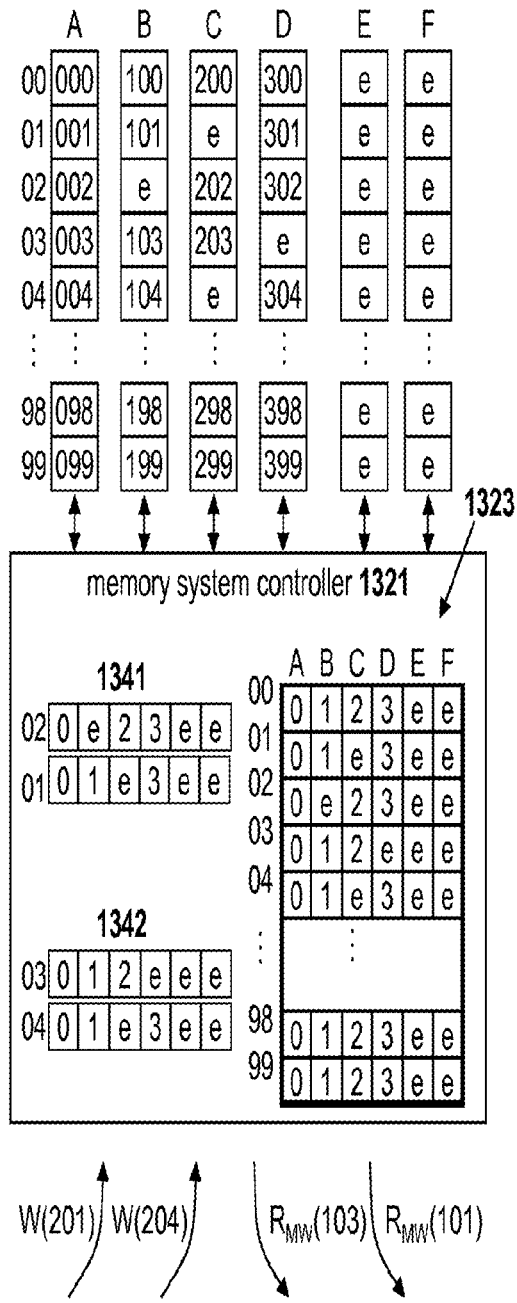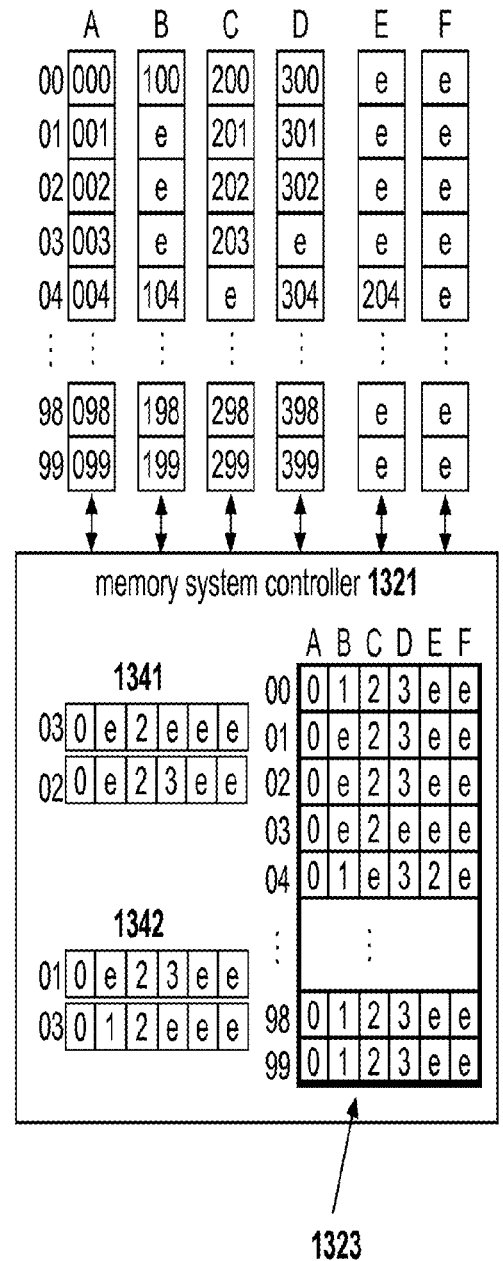
Figure 13E
Figure 13F

US 9,280,464 B2

SYSTEM AND METHOD FOR SIMULTANEOUSLY STORING AND READING DATA FROM A MEMORY SYSTEM

RELATED APPLICATIONS

This application is a continuation of U.S. patent application Ser. No. 14/487,083, filed Sep. 15, 2014, which in turn is a continuation of U.S. patent application Ser. No. 13/865,997, filed Apr. 18, 2013, now U.S. Pat. No. 8,838,934, which in turn is a continuation of U.S. patent application Ser. No. 12/584,645, filed Sep. 8, 2009, now U.S. Pat. No. 8,433,880, which in turn claims the benefit of U.S. Provisional Application No. 61/161,025, filed Mar. 17, 2009. The entirety of each of these applications is incorporated herein by reference.

TECHNICAL FIELD

The present invention relates to the field of digital computer systems. In particular, but not by way of limitation, the present invention discloses techniques for quickly servicing access requests made to digital memory systems.

BACKGROUND

A computer system is a machine that manipulates data according to a list of computer instructions. A list of computer instructions created to solve a particular problem is generally referred to as a computer program. In general, a computer system sequentially processes the individual instructions that may access, manipulate, and store data. A type of computer instruction known as a 'branch instruction' allows the flow of the computer program to vary depending on the input data.

A general purpose computer system has four main sections: a control unit, an arithmetic and logic unit (ALU), a memory system, and some type of input and output system. The control unit is responsible for the overall operation of fetching computer instructions from the memory system and executing those computer instructions. The arithmetic and logic unit generally consists of a set of computer registers that contain data and may be combined and compared in various manners according to the specific computer instructions. The results of comparisons may direct the control unit on which computer instructions should be executed next.

The input and output system provides the computer system with a means of interacting with the outside world.

In most modern computer systems, the control unit, the arithmetic and logic unit (ALU), and a small subset of a memory system are combined into a single entity known as a central processing unit (CPU). Central processing units are generally implemented on a single integrated circuit in order to optimize the processing speed, the rate at which the computer system can execute instructions, of the computer system.

The small subset of a memory system that is often implemented on the same integrated circuit die allows the control unit and ALU to access the data in that small subset of memory very quickly since that subset of the memory system is generally implemented with a high-speed memory design (generally static random access memory devices also known as SRAM) and is physically close to the control unit and ALU. This small subset of the memory system is generally referred to as an 'On-chip cache memory system'. However, since modern operating systems and application programs are generally very large, the vast majority of a memory system (the main memory system) is generally implemented on separate memory integrated circuits that are coupled to the processor.

The main memory system for a modern computer system on separate integrated circuits is generally implemented with a different memory circuit implementation that provides much higher memory density (more memory bits stored per integrated circuit layout area) than the on-chip cache memory. For example, dynamic random access memory devices (DRAM) are generally used to construct main memory systems. These DRAM devices are generally not as fast as the SRAM devices used within on-chip cache memory. Furthermore, simply accessing separate memory integrated circuits not on the same integrated circuit is generally slower than accessing on-chip cache memory since the communication across a much longer conductor to the external memory device cannot operate at the same high frequency as the CPU core. Thus, when a CPU needs to access data from off-chip main memory system, the CPU may be forced to stall or operate at a rate slower than the potential maximum operating rate of the CPU.

The speed at which central processing units (CPUs) operate have been continually increasing. Specifically, decreasing the size of the semiconductor transistors and decreasing the operating voltages of these transistors has allowed processor clocks to run at faster rates. However, the performance of external memory systems that provide data to these faster processors have not kept pace with the increasingly faster CPUs. Various techniques such as larger on-chip cache memories, greater parallelism, and larger off-chip cache memories have helped mitigate this issue. However, there are still many occasions when a CPU is not achieving its full potential due to external main memory systems that cannot respond to memory requests from the CPU as fast as the CPU can issue these memory requests. Thus, without sufficiently fast memory systems, a very high-speed CPU will be starved of instructions and data to process and thus forced to stall while waiting for data from the main memory system. Thus, it is desirable to improve the speed of memory systems such that memory systems can handle memory read and write operations as fast as possible.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 7A illustrates an initial starting state for a virtualized memory system receiving simultaneous read and write operations.

FIG. 7B illustrates the state of the virtualized memory system of FIG. 7A after processing the read and write operations.

FIG. 7C illustrates the virtualized memory system of FIG. 7B receiving another set of simultaneous read and write operations.

FIG. 7D illustrates the state of the virtualized memory system of FIG. 7C after processing the read and write operations.

FIG. 9C illustrates the virtualized memory system of FIG. 9B receiving another set of simultaneous read, write, and write operations.

FIG. 9D illustrates the state of the virtualized memory system of FIG. 9C after processing the read, write, and write operations.

FIG. 10A illustrates an initial starting state of a virtualized memory system receiving simultaneous write and destructive read operations.

FIG. 10B illustrates the state of the virtualized memory system of FIG. 10A after processing the initial starting state of a virtualized memory system receiving simultaneous operations.

FIG. 10C illustrates the virtualized memory system of FIG. 10B receiving another set of simultaneous initial starting state of a virtualized memory system receiving simultaneous operations.

FIG. 10D illustrates the state of the virtualized memory system of FIG. 10C after processing the initial starting state of a virtualized memory system receiving simultaneous operations.

FIG. 11A illustrates a virtualized memory system that can perform two read operations and one write operation simultaneously using fast destructive read operations.

FIG. 11B illustrates the state of the virtualized memory system of FIG. 11A after performing the two destructive read operations and a single write operation.

FIG. 12C illustrates the virtualized memory system of FIG. 12B receiving another read operation that may be followed by a write-back operation.

FIG. 12D illustrates the state of the virtualized memory system of FIG. 12C after processing the read operation.

FIG. 12E illustrates the virtualized memory system of FIG. 12D receiving a write-back from the read operation in FIG. 12A along with another read operation that may be followed by a write-back operation.

FIG. 12F illustrates the state of the virtualized memory system of FIG. 12E after processing the write-back operation and the read operation.

FIG. 12G illustrates the virtualized memory system of FIG. 12F receiving a write-back from the read operation in FIG. 12C along with another read operation that may be followed by a write-back operation.

FIG. 12H illustrates the state of the virtualized memory system of FIG. 12G after processing the write-back operation and the read operation.

FIG. 13E illustrates the virtualized memory system of FIG. 13D receiving two additional read/modify/write operations and two write operations associated with the read/modify/write operations of FIG. 13A.

FIG. 13F illustrates the state of the virtualized memory system of FIG. 13E after handing the initial read of the two read portions of read/modify/write operations and two write-back operations of FIG. 13E.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to computer processing systems used for packet-switched networks, the teachings can be used in many other environments. Thus, any digital system that uses digital memory can benefit from the teachings of the present disclosure. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
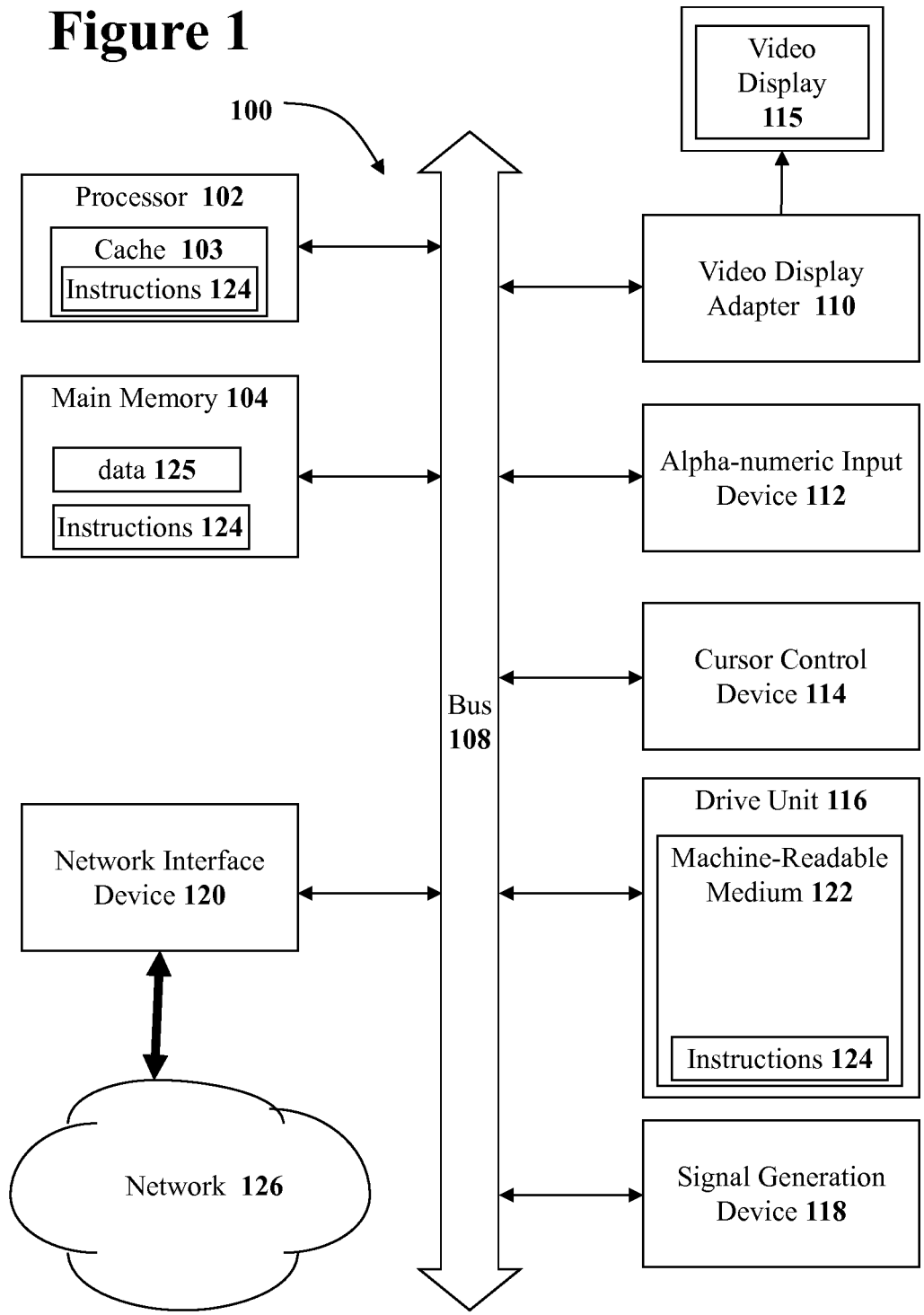
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Traditional Virtual Memory

Referring to the example computer system 100 of FIG. 1, the processor 102 executes instructions 124 that are generally fetched from main memory 104 or fetched from an on-chip cache memory 103 within the processor 102 itself. However, the desire to create larger computer programs and handle ever larger data sets created difficulties for computer programmers since the computer programmers would eventually nm out of available memory space in the main memory 104. To handle the problem of limited amounts of main memory, the concept of virtual memory was created.

With virtual memory, a very large address space of 'virtual memory' is provided to a computer programmer to work with. However, in reality, the computer system with virtual memory does not actually contain as much physical semiconductor memory that would be needed to represent the entire virtual memory address space. Instead, just a subset of the virtual address space is actually available within a physical semiconductor memory of the computer system. The rest of the virtual memory space is stored elsewhere. A conceptual illustration of virtual memory system 220 is presented in FIG. 2.

Figure 2:
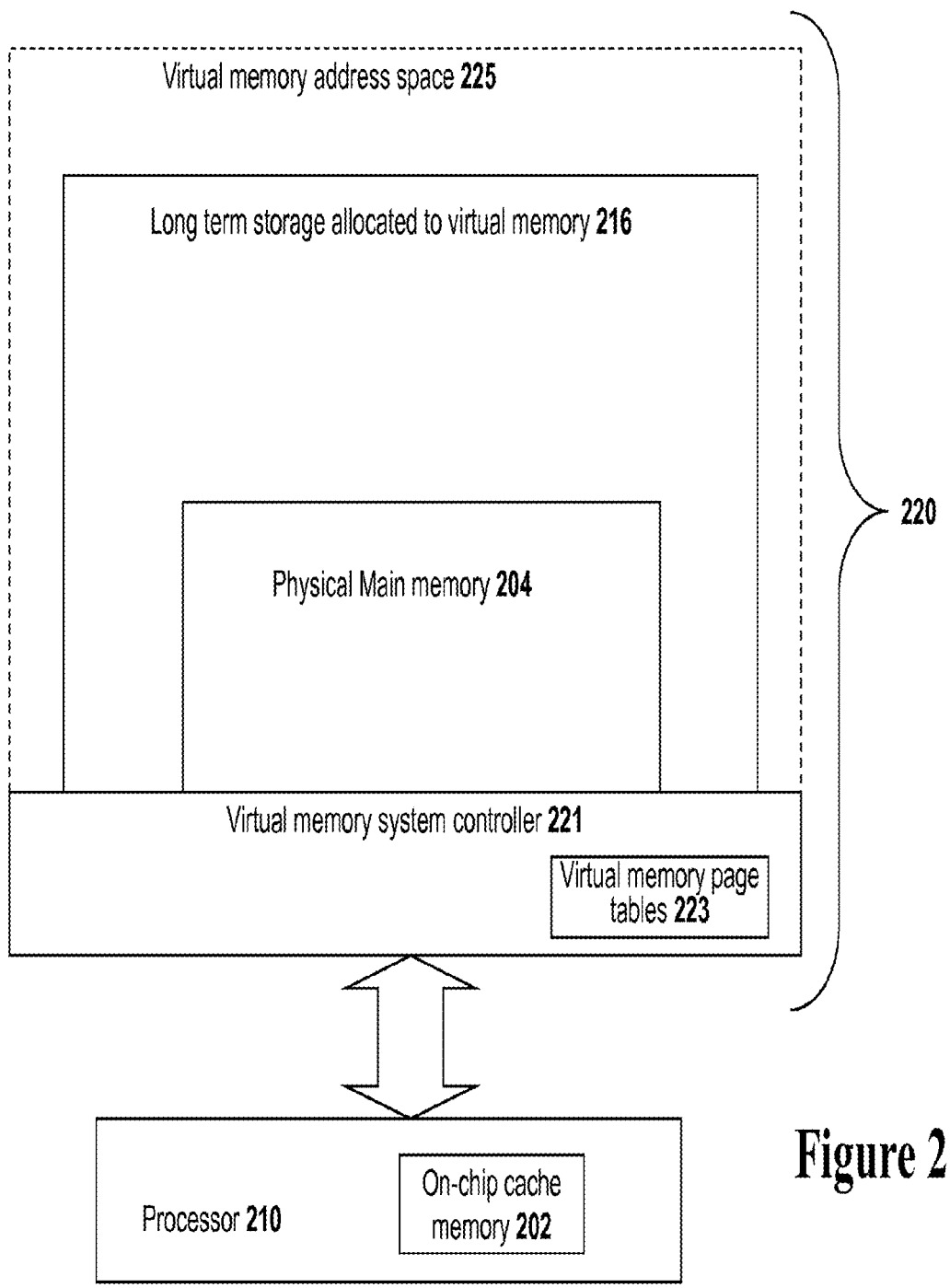
FIG. 2 illustrates a conceptual diagram of a traditional virtual memory system that creates the appearance of a larger main memory system than is actually available.

Referring to FIG. 2, the virtual memory system 220 includes a large virtual memory address space 225 that represents all of the available virtual memory for a computer programmer to use. The processor 210 accesses the data in the large virtual memory address space 225 through a virtual memory system controller 221 that is responsible for handling all accesses to the virtual memory system. (Note that the processor 210 may also include an on-chip cache memory 202 which represents a duplication of a small subset of the available memory.)

With a virtual memory system 220, only a currently needed subset of instructions and data from a large virtual address space 225 is actually physically represented within a real physical main memory 204 of the computer system. The virtual memory controller 221 is responsible for translating virtual memory addresses into physical memory addresses with in the physical main memory 204. This physical main memory 204 is typically implemented with semiconductor memory devices such as dynamic random access memory devices.

All of the other computer instructions and data that have been loaded into the virtual memory address space 225 but are not represented in the physical main memory 204 are stored in a long term storage system 216. In a typical personal computer system, this long term storage is typically provided by hard disk drive unit 116 as depicted in FIG. 1. (Although some systems are now using flash memory as long term storage.) Note that virtual address space 225 may be larger than the portion long term storage system 216 currently allocated for use with the virtual memory system 220 since the processor 210 may have not accessed certain parts of the virtual memory address space and thus the state of the region of virtual memory that has not been accessed is undefined. However, when the processor 210 accesses those previously untouched portions of the virtual address space then the virtual memory system 221 will allocate additional long term storage space 216 from the long term memory system to handle those newly accessed areas of the virtual memory address space 225. Many virtual memory systems allocate a region of long term storage equal to the entire size of the virtual memory address space to ensure that sufficient long term storage will always be available to the virtual memory system 220.

The virtual memory system controller 221 is responsible for ensuring that currently needed instructions and data from the virtual memory address space 225 are loaded into the physical main memory 204. If a needed section of virtual memory address space 225 is not currently represented in the physical main memory 204 then the virtual memory system controller 221 reads that section of virtual memory address space from the long term storage system 216 and brings it into the real main memory 204. In order to make space for the new section of virtual address space needed, the virtual memory system controller 221 will move a section of instructions and data currently in the real main memory 204 out to the long term storage 216. This is often referred to as 'swapping'. Numerous algorithms exist to help determine which particular section of memory will be least likely to be accessed soon in order to reduce the number of swaps that must be performed.

As set forth above, the concept of virtual memory allows a small amount of real physical main memory 204 to represent a much larger amount virtual memory address space 225 with the help of additional storage space allocated from long term storage 216. However, this ability to represent a much larger virtual address space than the actual physical address space available comes at a cost. Specifically, the average performance of the overall memory system will be slower since data in the slower long term storage system 216 must be accessed when a needed section of the virtual memory address space 225 is not currently represented in the main memory 204.

High-Speed Memory Techniques

For some demanding applications, the use of long term storage is not a viable option due to high-bandwidth memory needs. For example, in a high-speed network device such as a network router, the network router must rapidly store incoming data packets from a first communication link into a memory. The router must later read the stored data packets back from memory for transmission on another communication link. This must all be performed at a very high speed in order to keep the communication links filled with data. Thus, a virtual memory system cannot be used in such an application.

Thus for certain applications, such as the packet routing application described above, a fast memory response is needed for every memory location used to store data. For these applications requiring consistent fast memory performance, the entire memory system may be constructed with real physical memory devices. In this manner, every memory location will be able to store and recall data at the full speed of the integrated circuit devices used to construct the memory system.

However, even with an entire computer memory system constructed using physical semiconductor memories, the memory system may still not provide the desired memory performance for some very demanding applications. The very high speed of modem processors and digital communication links has caused memory systems to become the performance bottleneck that is limiting overall computer system performance increases. New techniques are needed to satisfy the extremely high memory performance requirements of certain computer applications.

Referring to FIG. 2, one obvious solution would be to greatly increase the size of the on-chip cache memory 202 implemented within a processor 210. If all of the high-speed memory needs for a particular application can be satisfied by the limited address space within on-chip cache memory 202 then this technique can be used. However, this is not a completely satisfactory solution for many different reasons. A computer processor with a very large on-chip cache memory 202 will require a large integrated circuit die size such that processor yields (the percent of fully-operable integrated circuits from a batch of integrated circuits made) will go down. Furthermore, with less integrated circuit die area for the processor circuitry, the processor circuitry cannot be made too complex. Due to its limitations, a computer processor constructed with a very large cache memory system would be niche product and thus expensive since a large market will not exist for that processor. However, the biggest problem with this solution is that many applications will simply require a much larger memory address space than can be implemented with an on-chip cache memory 202. Thus, new techniques for improving the performance of main memory systems are required.

Page-Mode Operation

With many semiconductor memory circuit designs there tends to be certain types of memory access patterns or modes of operation that allow the semiconductor memory device to respond faster or slower. Taking advantage of these special situations can improve the overall performance of a memory system constructed with these devices.

For example, with dynamic random access memory (DRAM) devices the individual memory cells are typically arranged in a two-dimensional matrix of rows and columns. When a processor reads from a particular random memory location in the DRAM device, the entire row of memory cells in which that particular memory location resides within is read out of the two-dimensional memory matrix and placed into a buffer. If the next memory location needed by the processor resides within that same row of that same memory device, then a special fast type of memory request can be made to that DRAM device such that the DRAM will respond very quickly with that data since the data is already available in buffer within the DRAM device. This type of memory operation wherein memory locations located in the same row of the memory matrix is known as "page-mode" operation.

The page-mode operation of DRAMs can be used to improve the overall performance of a memory system. However, the memory systems require some type of memory control system that is designed to take advantage of page-mode operation in order to realize the speed gains from page-mode operation. One method of taking advantage of page-mode operation is to have the memory controller determine if a successive memory request is to the same row just accessed within a particular DRAM device. If the processor makes a successive memory request to a memory address in the same memory row of a DRAM that was just accessed then the memory controller will issue the special fast type of memory request for that data within the same row.

Another similar type of system of taking advantage of DRAM page-mode operation is to implement a distributed cache system within the DRAM devices. For example, U.S. Pat. No. 4,715,945 issued to Kronstadt, et al discloses "Distributed Cache in Dynamic RAMs". The system of the Kronstadt, et al reference discloses a memory system with a distributed cache. The memory system is organized into various memory banks wherein each memory bank has a cache that contains the contents of the most recent memory row read from the DRAMs in that memory bank. When a memory bank is read from, the memory controller determines if the memory request is to the same row that is within the cached row for that memory bank. If the memory request is address to the row in the cache then a cache 'hit' has occurred and the memory request can be satisfied quickly using the data in that cache. If the memory request is not to the same row then a cache 'miss' occurs and the data must be accessed from the memory matrix in the DRAM. When this access occurs, the entire row from that memory access will be placed into the cache row for that memory bank.

The distributed cache of the Kronstadt, et al reference improves the average memory access time due to an improved response time when cache hits occur. However, it only provides the advantage of adding a small cache memory to the main memory system wherein the memory controller has no control over cache replacement system. Furthermore, there is no guarantee that any particular random memory request will be faster than a normal DRAM memory system. Thus for applications that require a fast response time for every memory address location, the system of the Kronstadt, et al reference will not suffice.

Interleaved Memory Banks

Another property of memory devices is that when a first memory request is made to a memory device then that memory device will respond quickly. However, if an immediate subsequent memory request is made to any memory address within that same memory device, the memory device will not be able to respond as fast as it was able to respond to the first memory request. The reason for this is that, internally, the memory must perform some type of maintenance action to complete the memory access cycle. For example, with DRAMs, the DRAM memory device must perform a refresh to the memory row that was read out of the memory matrix before responding to the subsequent memory request.

Memory systems can take advantage of the fact that memory devices respond with data before completing a full memory cycle by organizing the memory address space into various independent memory banks wherein each memory bank is constructed from different memory devices. Then, these memory banks are interleaved in a manner that will cause most sequential memory banks to access a different memory bank. In this manner, the system will enjoy the fast memory response of an initial memory access for most memory accesses. As long as the time to complete the refresh of the memory before being ready for a subsequent access is less than the response time for data after initiating a read cycle, each memory bank will be ready to respond to every other memory request with a fast response time.

Figure 3A:
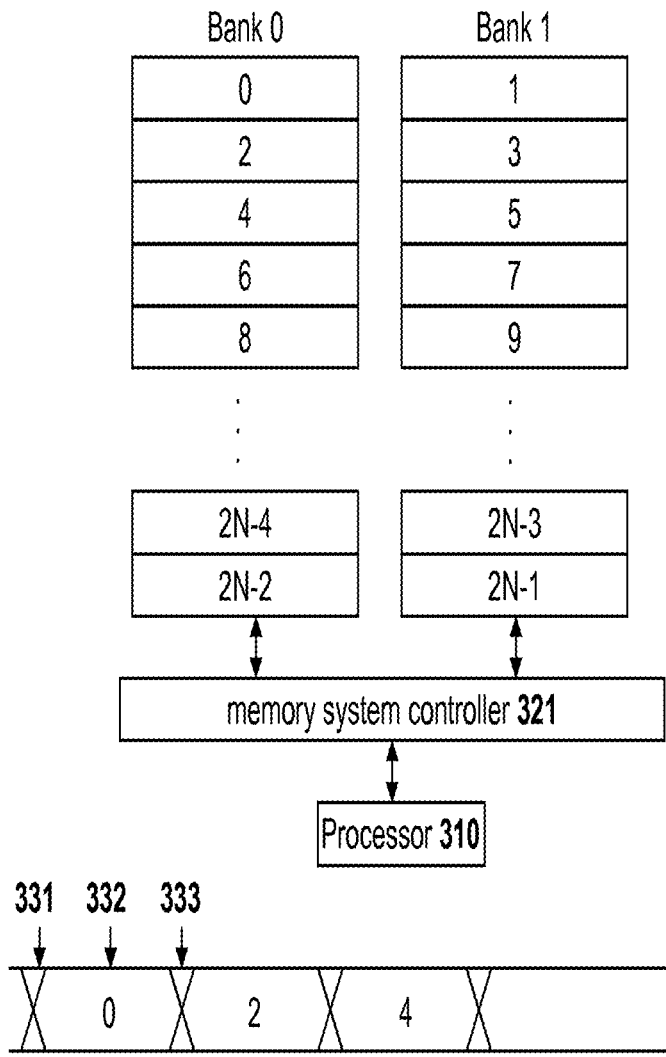
FIG. 3A illustrates an interleaved memory system.

FIG. 3A illustrates an example of a simple two-way interleaved memory system. In the two-way interleaved memory of FIG. 3A there are two memory banks: Bank 0 and Bank I. The two memory banks are independent such that when bank 0 is currently busy completing a memory operation then bank 1 will be immediately available to respond quickly to a memory access. (Similarly, when bank 1 is currently busy completing a memory operation then bank 0 is will be available.) The addressing scheme for the memory system is interleaved such that every sequential address is in the other memory bank. Thus, as illustrated in FIG. 3A, address 0 is in bank 0, address 1 is in bank 1, address 2 is in bank 0, address 3 is in bank 1, and so on.

When a computer program executes, the processor in the computer system generally needs to read in computer instructions that are organized sequentially in memory. Thus, when sequentially reading the memory addresses from the memory system of FIG. 3A each sequential access will be from other memory bank. First address 0 in bank zero is read, then address 1 in bank 1 is read, then address 2 in bank 0 is read, and so on. Since the memory banks are independent, the accesses to a different memory bank may occur while another memory bank is still busy completing a previous memory access operation. Thus, the memory accesses can be staggered as illustrated in FIG. 3B to improve the performance of the memory system.

Figure 3B:
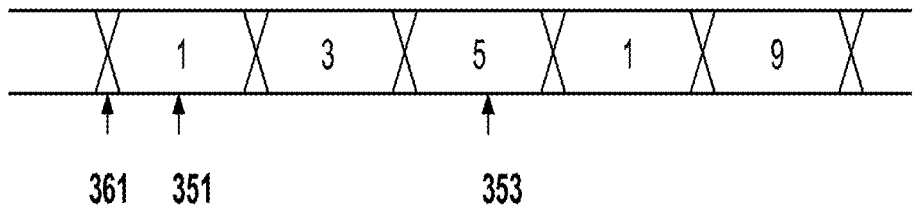
FIG. 3B illustrates a timing diagram illustrating the use of the interleaved memory system of FIG. 3A.

Referring to FIG. 3B, the processor may first request address 0 at time 331. Bank 0 will respond with the data from address 0 at the time 332. However, at time 332 Bank 0 cannot immediately accept another memory request since Bank 0 must perform some internal action (such as a memory refresh). However, since the next sequential memory access is to address 1 within memory bank 1 which is not busy, the request to address 1 can be issued immediately at time 361. While bank 1 is responding to the memory request to address 1, bank 0 is finishing the internal operations needed after the access to address 0. When bank 1 responds with the data from address 1 at time 351 then bank 0 will be ready for another memory request at time 333. Therefore, the processor can issue a memory access request to address 2 at time 333. Thus, an interleaved memory system can be used to help mask the total read cycle of DRAM devices.

However, this technique of interleaving memory only works as long as you are accessing a different memory bank after each memory access. If an immediate successive memory access request is to the same memory bank that was just accessed, the performance increase will not be achieved. For example, if after obtaining data from memory address 5 at time 353 the processor then needs to access memory address 1 (such as if there is a program loop back to address location 1) then the processor must wait for bank 1 to complete the internal actions associated with the previous memory access to memory address 5 before attempting to access memory address 1 located within the same memory bank. And if the processor then sequentially accesses another memory address in bank 1, such as memory address 9, then the memory system will again have to wait for bank 1 to complete the previous memory access to address 1. Thus, there will be no more overlapping memory access with bank 0. Thus, the advantages of interleaved memory are lost when there are successive memory accesses to the same memory bank.

To increase the performance of memory operations in an interleaved system, a computer program can be written in a manner that avoids the memory bank conflicts when accessing program data. Although this is possible, it is difficult to write computer code that will always avoid all memory bank conflicts. It is very difficult and time-consuming for computer programmers to carefully craft their computer code to deal with such constraints. Furthermore, the vast majority of computer software development is done in high-level computer languages such as C, C++, Pascal, FORTRAN, etc. These high-level programming languages lack any features to handle such memory bank constraints such that programming would need to be done in assembly language that is very difficult to work with.

Accessing Independent Memory Banks in Parallel

As set forth with reference to FIGS. 3A and 3B, the operation of different memory banks may be completely independent of each other. Thus, two completely independent memory access operations can be performed on two different memory banks simultaneously. This allows for the creation of high speed memory systems that achieve their high memory bandwidth by serving multiple consumers of memory simultaneously. By allowing two different users of a memory system to access independent memory banks simultaneously, the effective memory bandwidth for the memory system is doubled.

Figure 4A:
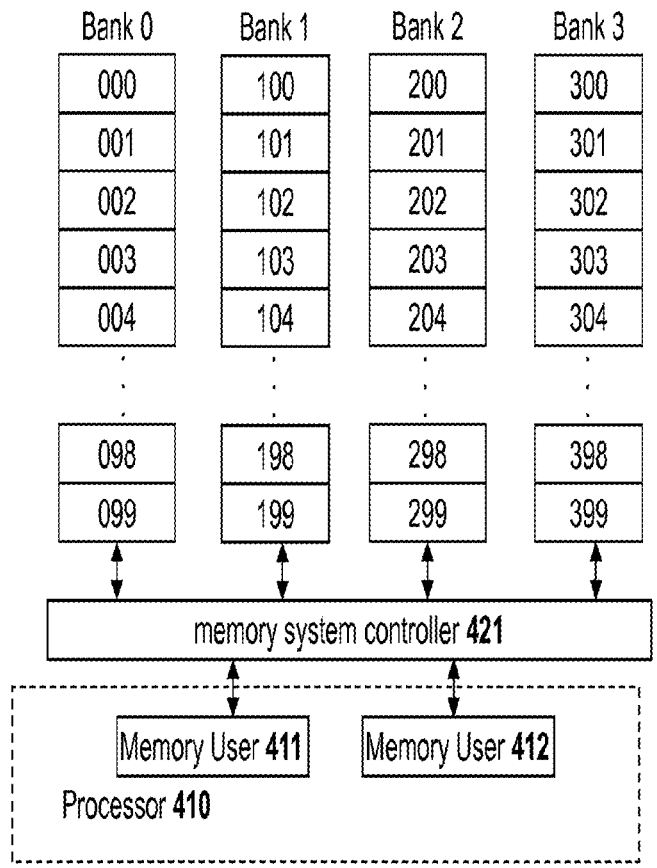
FIG. 4A illustrates a memory system having multiple independent memory banks

FIG. 4A illustrates an example of a memory system having four independent memory banks (bank 0, 1, 2, and 3) that allows multiple memory requests to be received from two different memory user 411 and memory user 412. As long as the two memory users (411 and 412) access different memory banks then those two memory users can share the memory system and operate without stalling. Thus, as illustrated in the timing diagram of FIG. 4B, memory user 411 can access memory address 000 while memory user 412 accesses memory address 101. Then memory user 411 can access memory address 202 while memory user 412 accesses memory address 304.

Figure 4B:
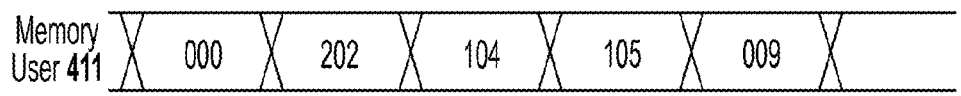
FIG. 4B illustrates a timing diagram illustrating the use of the multiple bank memory system of FIG. 4A.
Figure 4B:
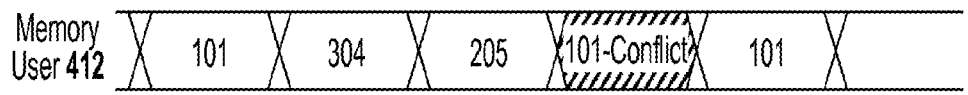

However, if the two memory users (411 and 412) attempt to access the same memory bank, then at least of the memory users must be stalled. For example, in the fourth data period illustrated in FIG. 4B, memory user 411 accesses memory address 105 while memory user 412 attempts to accesses memory address 101. Since memory address 105 and memory address 101 are in the same memory bank (memory bank 1), one of the memory users must be delayed. In the example of FIG. 4B, memory user 411 is giving priority such that memory user 412 is stalled since its memory access of memory address 101 cannot be completed until after waiting for memory user 411 to complete its access of memory address 105.

The preceding description of the memory system disclosed in FIG. 4A was made with reference to two individual memory users: memory user 411 and memory user 412. However, the memory system disclosed in FIG. 4A can just as easily be used with a single memory user that is operating at twice the speed of memory user 411 and memory user 412. If processor 410 operates at twice the clock speed of memory users 411 and 412, then processor 410 will be able to issue two memory requests in the single clock cycle used by memory users 411 and 412. These two memory requests can be presented to memory system controller 421 simultaneously. Thus, from the perspective of memory system controller 221, a single entity issuing memory requests at twice the speed is no different than two entities issuing memory requests at a normal speed.

In order to maximize the memory bandwidth for the memory system illustrated in FIG. 4A, the programmers for such a system should carefully construct their computer code such that memory bank conflicts are minimized. However, as set forth earlier, creating such constraints makes the programming for such a system difficult and time-consuming. And as noted earlier, high-level programming languages do not have features that will allow a programmer to ensure such constraints are being observed.

In an ideal memory system, multiple different entities could access any address location of that memory system simultaneously. None of the simultaneous memory accesses to any memory location in this ideal system would cause any memory bank conflict that would stall the system. Furthermore, this system would not impose any special programming constraints such that a programmer could use any high-level language without worrying about when a memory conflict would occur or not.

A New Paradigm for High-Speed Memory Systems

To construct a real memory system that is closer to an ideal memory system that allows multiple entities to access memory with very fewer constraints, the present disclosure introduces a "virtualized memory system". The virtualized memory system accomplishes this goal without imposing any specific programming restraints upon the user of the virtualized memory system. The virtualized memory system of the present disclosure allows for a simultaneous read and write operations to the same memory bank with suffering the penalties typically associated a memory bank conflict.

The virtualized memory system operates in a manner analogous to traditional virtual memory as disclosed in FIG. 2. Like traditional virtual memory, the highspeed virtualized memory system of the present disclosure allows programmers to work in a virtualized memory address space without having to worry about the specific details of how the virtualized memory system specifically operates. Instead, a virtualized memory controller translates all memory access requests made to a virtualized memory address space into a physical memory address space. However, the virtualized memory controller accomplishes this address space translation in a manner that prevents any memory bank conflicts from affecting the performance of the entity that is using the virtualized memory system. Thus, optimum memory performance is achieved from the perspective of the entities sending memory access requests to the virtualized memory system.

Behind the scenes, the virtualized memory system translates the memory requests made in a virtualized address space into a real physical address space using a set of mapping tables that ensure there will be no memory bank conflicts that will reduce performance of the entity accessing the virtualized memory system. In order to accomplish this goal, the virtualized memory controller maps the virtualized memory address space to a larger physical address space. Using the larger physical memory address space, the virtualized memory system hides the effects of any memory bank conflicts from the user of the memory system. Thus, whereas traditional virtual memory system (such as the one illustrated in FIG. 2) maps a larger virtual address space 225 onto a smaller physical memory address space 204 in order to achieve the appearance of a larger memory space; the virtualized memory system of the present disclosure maps a smaller virtualized address space onto a larger physical memory address space in a manner that achieves an improved memory performance.

Figure 5:
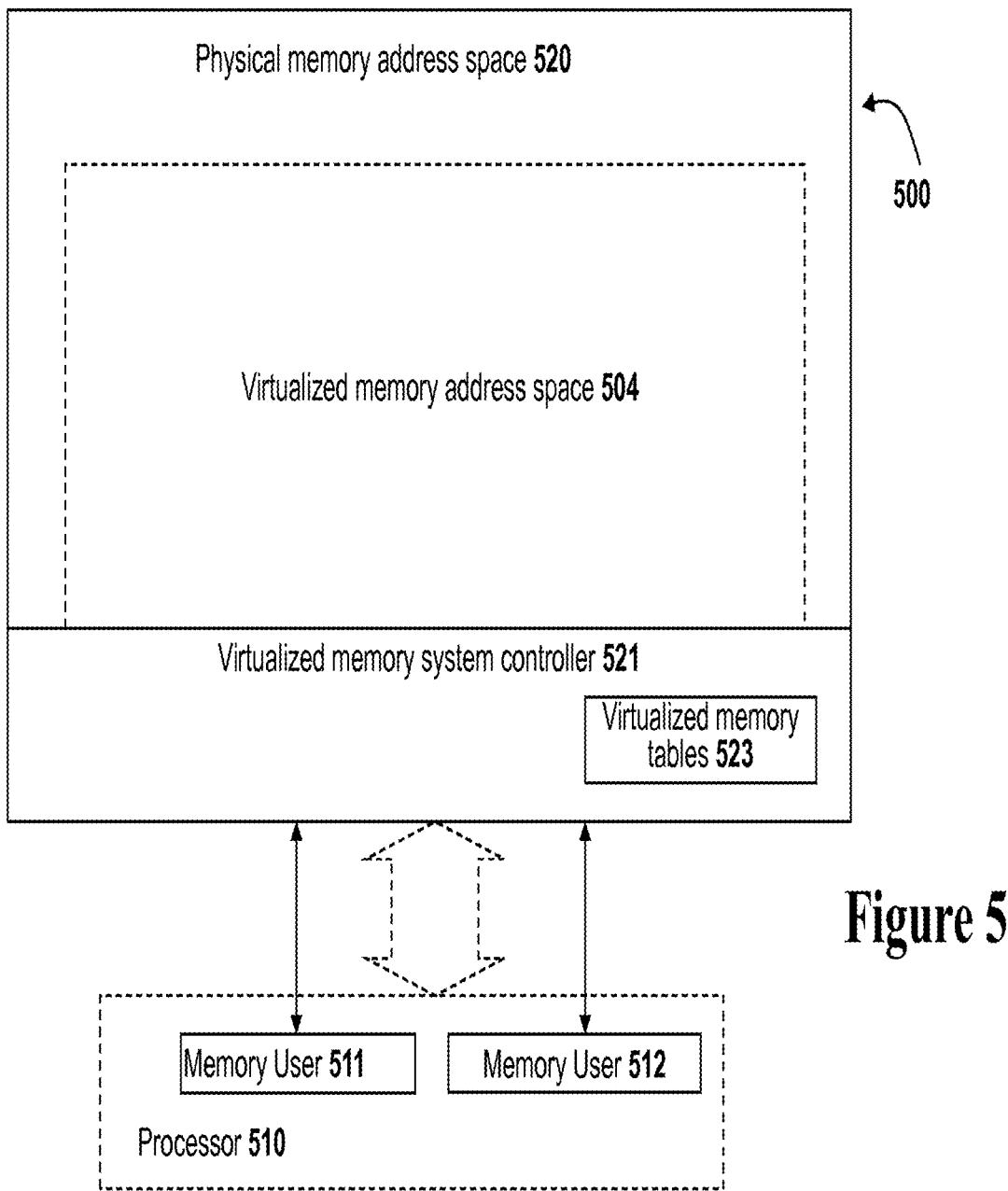
FIG. 5 illustrates a conceptual diagram of a virtualized memory system that uses additional physical memory to make a smaller virtualized memory space provide better performance.

FIG. 5 illustrates a conceptual diagram of the virtualized memory system 500 of the present disclosure. In the system disclosed in FIG. 5, memory user 511 and memory user 512 access the same virtualized memory system 500. All of the memory access requests to the virtualized memory system 500 are handled by a virtualized memory system controller 521. The virtualized memory system controller 521 translates all memory access requests made to a virtualized memory address space 504 into a larger physical memory address space 502. The virtualized memory system controller 521 performs this address space translation with the aid of one or more virtualized memory tables 523 in the virtualized memory system controller 521. The end result of the address space translation is that patterns of memory access requests from memory user 511 and memory user 512 that would typically cause performance-reducing memory bank conflicts in a prior memory system (such as the system illustrated in FIG. 4A) do not cause memory bank conflicts from the perspective of memory user 511 and memory user 512.

As with the system of FIG. 4A, the concurrent memory requests to the virtualized memory system 500 may be from a single entity operating at twice the speed. Thus, processor 510 operating at twice the clock speed of the virtualized memory system 500 could issue two sequential memory requests that would appear as two memory requests received concurrently by virtualized memory system 500.

Virtualized Memory System Internal Organization

Figure 6:
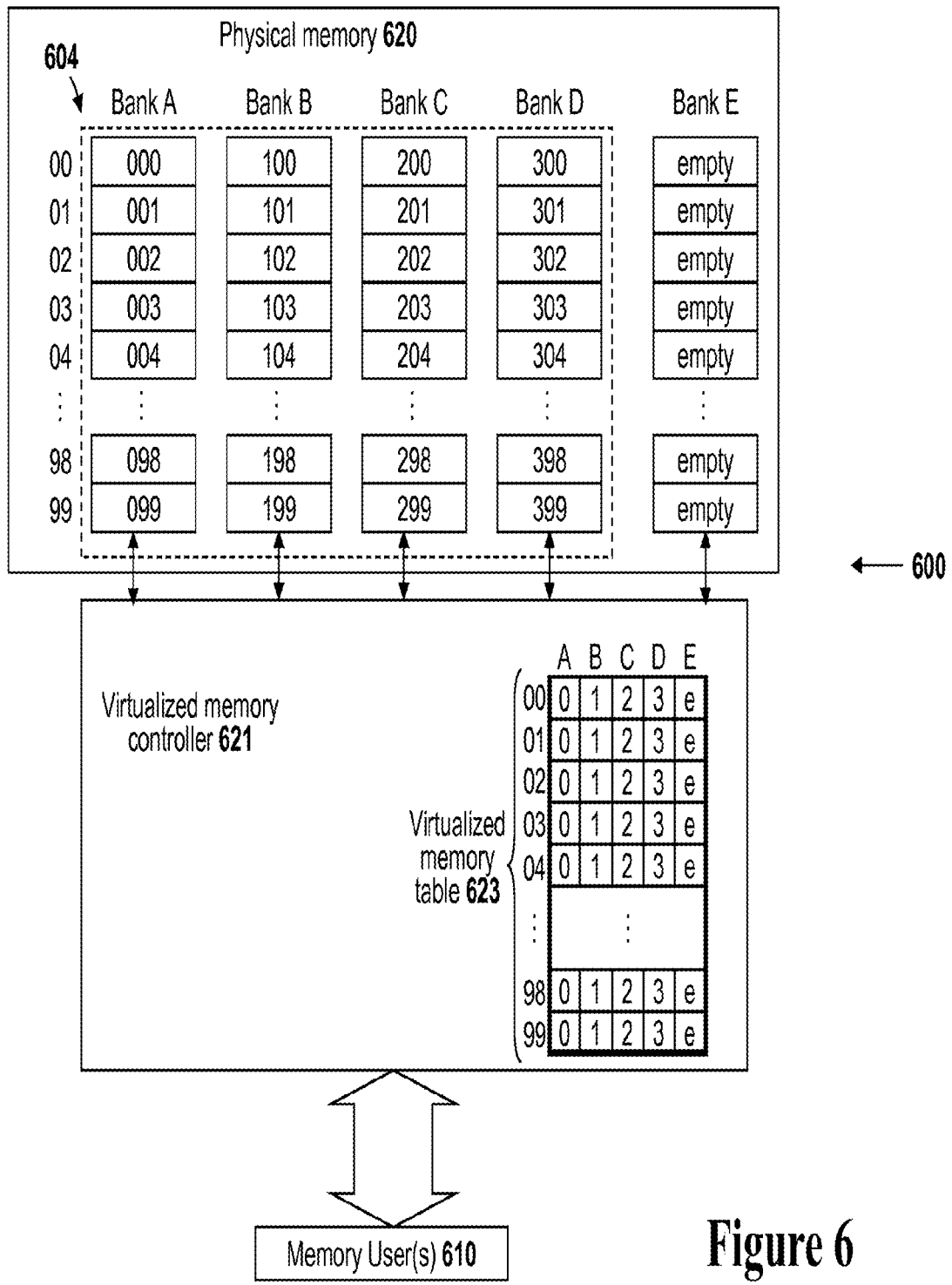
FIG. 6 illustrates a block diagram of one implementation of a virtualized memory system.

FIG. 6 illustrates a block diagram of a first embodiment of a virtualized memory system 600. As previously depicted in the conceptual diagram of FIG. 5, the virtualized memory system 600 mainly consists of a virtualized memory system controller 621 and physical memory 620. The physical memory 620 of FIG. 6 is organized into five independent memory banks (Bank A to E) having 100 rows each. For ease of explanation, this document will refer to memory bank sizes and memory addresses with base 10 (decimal) numbers but most actual implementations would use an even multiple of 2 for a base 2 (binary) address system. In the virtualized memory system 600 embodiment of FIG. 6 that has five memory banks with 100 rows in each memory bank, there are 500 unique physical memory addresses in the physical memory 620.

As set forth FIG. 5, the virtualized memory system presents a virtualized memory address space that is smaller than the actual physical address space to users of the virtualized memory system. Thus, in the embodiment of FIG. 6, an initial virtual memory address space 604 (surrounded by a rectangle made of dotted lines) comprising virtualized memory addresses 000 to 399 is represented within physical memory banks A to D. Physical memory bank E does not initially represent any of the virtualized memory locations such that memory bank E's memory locations are marked 'empty'. As depicted in FIG. 6, this document will specify a virtualized memory address that is currently being represented by a physical memory location as a three-digit virtualized memory address within the box of the physical memory location. For example, the physical memory location at row 00 of Bank B initially represents virtualized memory address 100 such at '100' is depicted within the box at row 00 of memory bank B. As will be set forth later in this document, the actual locations of the various virtualized memory addresses will move around in the physical memory space 620, thus the virtual memory address space 604 organization in FIG. 6 only represents an initial condition.

The virtualized memory system controller 621 is responsible for handling all virtualized memory access requests from the memory user(s) 610. The memory system controller 621 translates virtualized memory addresses (the 000 to 399 addresses in FIG. 6) into actual physical addresses (identified in FIG. 6 by the memory bank letter and the row within that memory bank) within the physical memory 620. To accomplish this address translation task, the memory system controller 621 uses at least one virtualized memory table 623. In the specific embodiment of FIG. 6, the virtualized memory table 623 has a number of rows equal to the number of rows in the memory banks and a number of columns equal to the number of memory banks. In this manner, there is both a one-to-one correspondence between the columns of virtualized memory table 623 and the memory banks and a one-to-one correspondence between the rows of virtualized memory table 623 and the rows in the physical memory banks Each entry in the virtualized memory table 623 specifies the most significant digit of the virtual memory address that is currently represented in the corresponding memory bank and row. Thus, in the initial condition, Bank A of the physical memory 620 contains addresses 000 to 099 such that every entry in the Bank A column of virtualized memory table 623 contains a '0'. (Again, note that this example is using decimal values only to simplify the explanation. An actual implementation would likely use a set of most significant bits from a binary virtualized memory address.) Similarly, in the initial condition, Bank B of the physical memory 620 contains addresses 100 to 199 such that every entry in the Bank B column of virtualized memory table 623 contains a '1'. And so on for memory banks C and D. In the initial state illustrated in FIG. 6, memory bank E does not represent any information from the virtualized memory address space and thus has the corresponding column E entries marked 'e' since bank E does not currently contain any information stored in the virtualized addresses.

Handling a Simultaneous Read and Write

The virtualized memory system 600 of FIG. 6 is configured to handle a read request with a simultaneous write request to any other address in the virtualized memory system 600 without ever forcing the memory user(s) 610 to stall due to a memory bank conflict. Thus, even if the read request and the write request are to the same memory bank (which would cause a memory bank conflict in most memory systems), the virtualized memory system 600 will handle the request without stalling the memory user(s) 610. Thus, the virtualized memory system 600 provides a guaranteed memory bandwidth such that all applications which require a guaranteed memory access time can use the virtualized memory system 600.

It should be noted that one situation that cannot be dealt with easily is when both a read and a write are received for the exact same address. Normally, a memory user should never issue such a request since there is really no reason to read an address when that same address is being written to by the same entity. However, if such a case occurs, the reader may be given the original data or the newly written data depending on the implementation.

As set forth earlier with reference to FIGS. 4A and 4B, a multi-bank memory system with independent memory banks can easily handle multiple simultaneous memory access requests as long as the memory access requests are directed to different memory banks in the memory system. For example, one memory user could write to Bank A in FIG. 6 while another memory user reads from Bank C with no difficulties. However, when two simultaneous memory access requests are directed to the same memory bank, then a memory bank conflict occurs.

The virtualized memory system controller 621 handles memory bank conflicts wherein a read operation and a write operation are simultaneously issued to the same memory bank by moving the virtualized memory address for the write operation to an unused memory location as listed in the virtualized memory table 623. An example of this is set forth with reference to FIGS. 7A and 7B.

FIG. 7A illustrates the same virtualized memory system 600 of FIG. 6 in the same initial condition. If the virtualized memory system controller 721 simultaneously receives a memory write to virtualized address 101, written as W(101) in FIG. 7A, and memory read to virtualized address 103, written as R(103), this memory access pattern would normally cause a memory bank conflict since both virtualized address 101 and 103 are in the same memory bank (memory bank B). To prevent the conflict, the virtualized memory system controller 721 allows the read of virtualized address 103 to proceed as normal in physical memory bank B but handles the write to virtualized address 101 using a different memory bank. The data currently residing in the current virtualized address 101 is no longer relevant since a new data value is being written to virtualized address 101.

To determine how to handle the write to virtualized address 101, the virtualized memory system controller 721 uses the least significant digits of address 101 to read row 01 of the virtualized memory table 723 to determine which memory bank has an unused memory location in that physical row. Upon identifying the memory bank having an unused memory location for that row, the virtualized memory'system controller 721 will then use that memory bank instead. In the example of FIG. 7A, the virtualized memory table 723 entry for the 01 row contains (0,1,2,3,e) which indicates that memory bank E has the empty location ("e"). Thus, virtualized memory system controller 721 stores the data for the write to virtual address 101 into the 01 row of memory bank E. This is illustrated as '101' in the 01 row of memory bank E in FIG. 7B. (The actual data value is not shown since it does not matter for this discussion.)

Since a new data value for virtualized memory address 101 has been written to a new location (row 01 of bank E), the old location that previously represented virtualized address 101 (row 01 of bank B) is no longer valid and should not be used. Therefore, the virtualized memory system controller 721 updates row 01 of the virtualized memory table 723 to reflect the new location of virtualized memory address 101 (row 01 of bank E) and the new memory bank having an empty location for row 01 (memory bank B). Thus, the virtualized memory system controller 721 writes a "1" in the E bank column for row 01 and an "e" (for empty) in the B bank column for row 01 in the virtualized memory table 723 as illustrated in FIG. 7B.

Note that the location of any particular virtualized memory address can be determined from the virtualized memory table 723. Specifically, the lower two digits of the virtualized address are used to selected a row in the virtualized memory table 723 and the column that contains the first digit of the virtualized address specifics the memory bank. For example, virtualized memory address 304 can be located in the physical memory by reading the '04' row of the virtualized memory table 723 and then locating the column of that row which contains '3' (the D column) such that virtualized address 304 currently resides in row 04 of memory bank D.

A second example of handling a simultaneous read operation and write operation is provided with reference to FIGS. 7C and 7D. FIG. 7C uses the state of FIG. 7B as a starting point and then simultaneously receives a write to virtualized address 201 and a read from virtualized address 204. To perform the read of virtualized address 204, the memory controller 721 first determines the location of virtualized address 204 in the physical memory. Thus, the memory controller first reads out the 04 row of virtualized address table 723 which contains (0,1,2,3,e). Since the first digit of the virtualized address 204 (a '2') is in the C column, the memory controller 721 reads the data for virtualized address 204 out of the 04 row of memory bank C. To handle the write to virtualized address 201 (which was previously in the 01 row of column C thus causing a memory bank conflict with the read from row 04 of memory bank C), the memory controller 721 reads row 01 from virtualized address table 723 to learn that the available (empty) memory bank for row 01 is now in memory bank B since row 01 of the table 723 contains (0,e, 2,3,1). Thus, the data associated with the write to location 201 is placed in row 01 of physical memory bank B as depicted in FIG. 7D. The memory controller 721 also updates table 723 to reflect the new location of virtual address 201 and the location of the new empty memory bank for that row (bank C).

As can be seen from the above two examples, the virtualized memory system will always have at least two locations where it can perform a write for any virtualized address: the current location of that virtualized address or the memory bank for that row designated as empty. If an incoming write does not cause a memory bank conflict with a simultaneous read, then the virtualized memory controller 721 will store the data in its current location. However, if there is a memory bank conflict caused by a read and write to the same memory bank, then the virtualized memory controller 721 will write the data to the memory bank having an empty location for that row and update the new location of that virtualized memory address in the virtualized memory table 723. The lowest two digits of the virtualized address space location will always designate the row in the physical memory space. (Or in a real digital implementation, a subset of bits from the virtualized memory address such as a set of least significant bits of the virtualized memory address.)

Multiple Entries in Each Memory and Table Row

Figure 8:
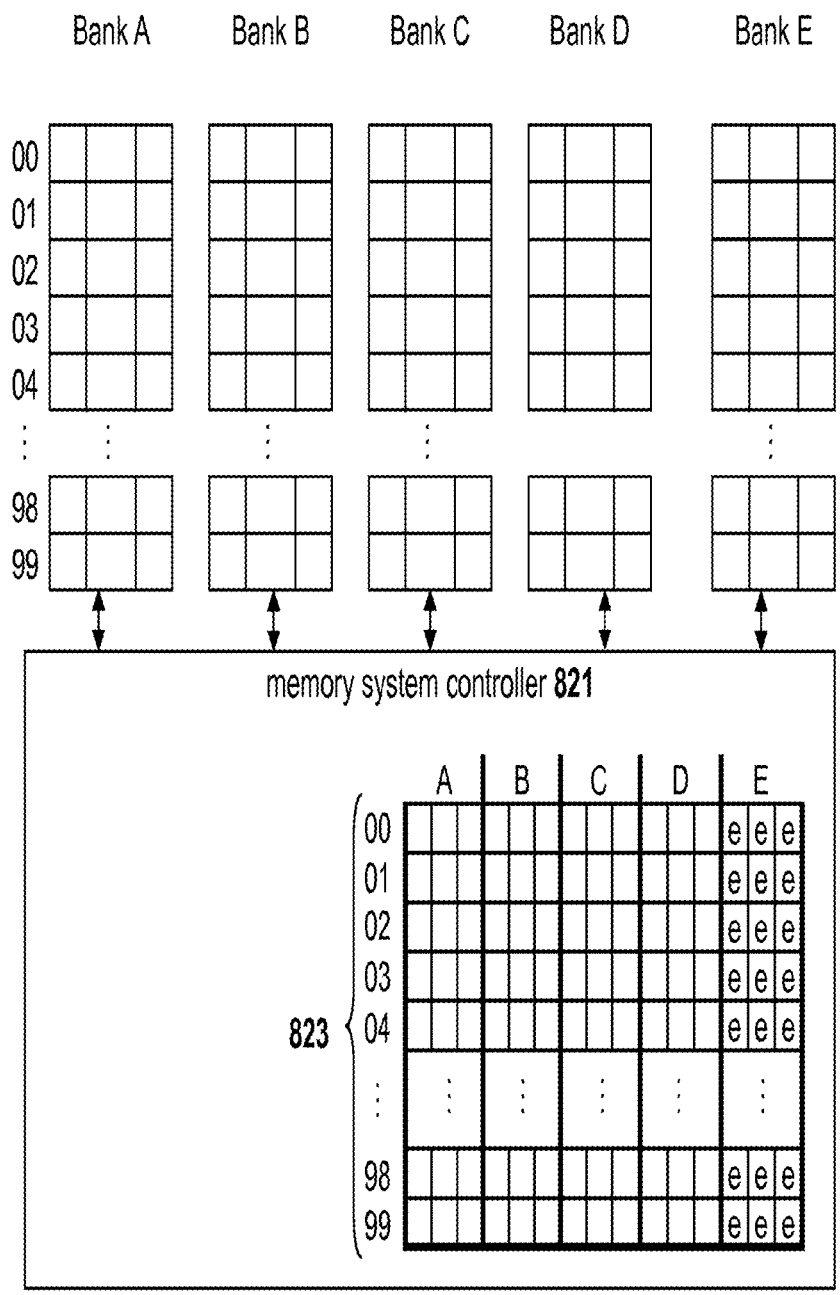
FIG. 8 illustrates another block diagram of an implementation of a virtualized memory system that stores more than one element in each memory row.

In the examples of FIG. 6 and FIGS. 7A to 7D, the rows of each memory bank (and the entries in the corresponding memory table) have been depicted as a single memory location. However, this is not a requirement of the system of the present disclosure. As long as individual columns of each memory bank can be read from and written to independently, each row of each memory bank may contain multiple individual data entries. FIG. 8 illustrates one possible example of such an implementation.

Referring to FIG. 8, each memory bank has been divided into three columns. Each of these columns in each row may represent a different virtual memory address within that same row of the memory bank. Note that additional address bits from the virtualized memory address must be used to specify which column in that memory bank row is specifically being addressed. To handle the different columns, the virtualized memory table 823 must also have a corresponding set of columns. In this manner, each individual column can be located, read, and moved as necessary. As illustrated in FIG. 8, there is still a one to one correspondence between addressable memory locations in the memory banks and locations in the virtualized memory table 823.

It should be noted that the implementation set forth in FIG. 8 may be advantageous in many implementations. By using memory circuits that read out wide rows of data, and thus have fewer read-out circuits per memory cell, greater memory density can be achieved. Thus, many (if not most) implementations may use the teachings set forth with reference to FIG. 8.

Single Read, Multiple Writes Simultaneously:

The virtualized memory system set forth in the previous sections can be expanded to handle more than one write operation along with a single simultaneous read operation. In order to handle additional write operations, there only needs to be an additional memory bank for each additional write operation that will occur simultaneously with the memory read. For example, to handle two write operations and one read operation two additional memory banks are required as illustrated in the embodiment of FIG. 9A.

Figure 9A:
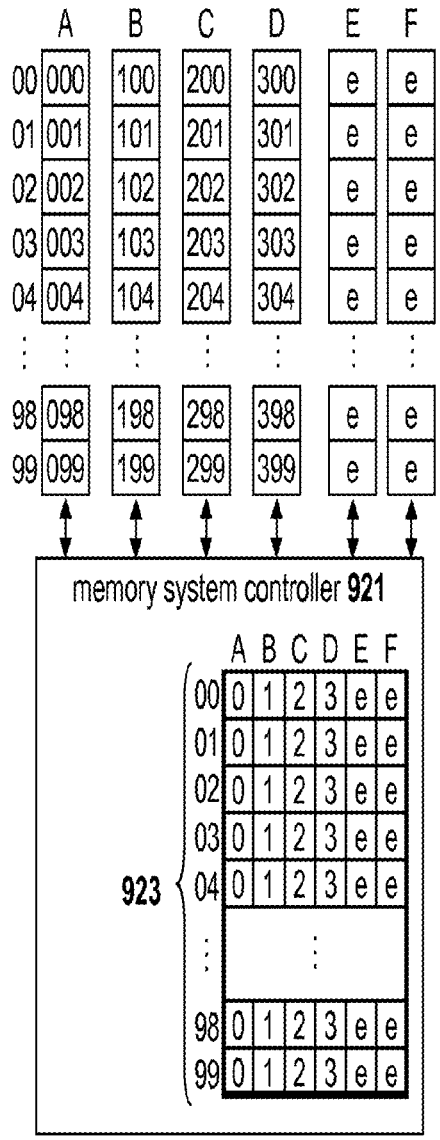
FIG. 9A illustrates an initial starting state of a virtualized memory system receiving simultaneous read, write, and write operations.

FIG. 9A illustrates one possible initial state for a virtualized memory system that can simultaneously handle one read operation and two write operations. As set forth in the previous sections, if the memory access requests access different memory banks then there is no memory bank conflict and all the memory operations are handled independently. However, in the example of FIG. 9A, three memory operations accessing virtualized memory addresses in the same memory bank (bank D) are received: a read to virtualized address 301, a write to virtualized address 303, and a write to virtualized address 398.

To handle the read to virtualized address 301, the memory system controller 921 access the virtualized memory table 923 and reads row 01 to discover that '3' is in the D column. Thus, the memory system controller 921 accesses row 01 of bank D to respond to the read request. Since memory bank is D busy handling the read operation, the write operations must be handled with different memory banks.

Figure 9B:
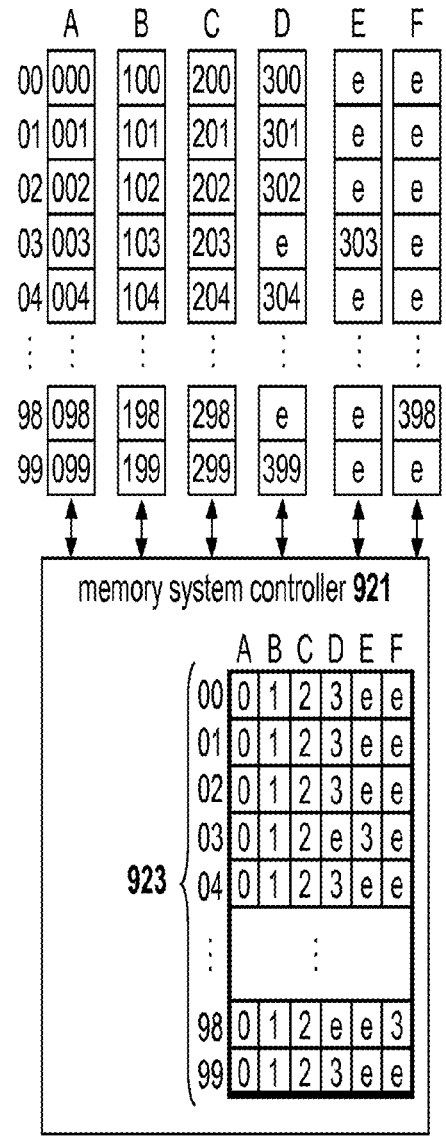
FIG. 9B illustrates the state of the virtualized memory system of FIG. 9A after processing the read, write, and write operations.

To determine which memory banks can handle the write operations, the memory system controller 921 access the virtualized memory table 923 and reads the correspond rows for the write operations (row 03 for the write to 303 and row 98 for the write to 398). Then memory system controller 921 then identifies the memory bank having empty locations specified by those rows. In this case, both of those rows report that memory banks E and F have an empty slot for those rows. The memory system controller 921 then stores the data from the memory write operations into those memory banks Note that since both rows reported memory banks E and F as being available, the memory system controller 921 must coordinate the writes in a manner that avoids another memory bank conflict. Thus, one of the write operations will use memory bank E and the other write operation will use memory bank F. In this example, the write to virtualized address 303 is written to memory bank E and the write to virtualized address 398 is written to memory bank F. The virtualized memory table 923 must then be updated to reflect the new locations for virtualized addresses 303 and 398 and the new empty banks for row 03 and 98. The final state after the read operation to address 301 and the two write operations to addresses 303 and 398 is illustrated in FIG. 9B.

Another example of a read operation and two write operations is illustrated in FIGS. 9C and 9D. FIG. 9C uses the state of FIG. 9B as a starting point and receives a read operation addressed to virtualized address 200, a write operation to virtualized address 203, and another write operation to virtualized address 299. The system operates in the same manner and the final state is illustrated in FIG. 9B. In this case the write for virtualized address 203 had banks D and F available and the write to virtualized address 299 had banks E and F available. In this case, the memory system controller 921 stored the data for the write to virtualized address 203 in row 03 of bank D and stored the data for the write to virtualized address 299 in row 99 of column E.

Additional write operations can be handled by adding additional memory banks to the physical memory. However, the number of accesses to the virtualized memory table 923 will eventually become very numerous such that virtualized memory table 923 will become overloaded. Various well-known techniques can be used to handle this issue such as keeping multiple parallel copies of virtualized memory table 923. For example, ping-pong memory system techniques, duplicate tables, and even the techniques disclosed in this document can be used to implement the virtualized memory table.

Additional Performance Gains with Destructive Reads

When a DRAM memory device responds to a memory read request, the DRAM memory device activates a read circuit for reading data out of memory matrix made up of columns and rows of memory cells. The read circuit in a typical DRAM device uses sense amplifiers to read out an entire row from the memory matrix into a driver row. A multiplexer is then used to select a desired subset of data from the driver row and serves that data to the memory reader.

During the read process, the data in the memory matrix is typically destroyed such that the DRAM device must write back (or refresh) the data such that the memory matrix continues to store the data. Specifically, the act of reading data from the memory cell dissipates the charge on the capacitor within the memory cell. Thus, before the DRAM device can handle any additional memory access requests, that DRAM device must write back (or restore) the data read out of the memory matrix. If a particular application only needs to read back a row of data just once then a destructive read can be used to improve memory read performance. Specifically, when a read request for a particular row is received, the memory device reads out the entire row from the memory matrix (thereby destroying the data in the row) and serves the row of data to the entity that requested the row of data. Since the memory device does not take the time to write the row of data back into the memory matrix, the memory device will immediately be ready for additional memory access requests. However, that row of data read from the memory matrix will no longer be available in the memory matrix.

The virtualized memory system of the present disclosure may take advantage of such destructive read operations to improve the performance of the memory system. However, using the teachings of the present disclosure, the data from the destructive read does not need to be lost. Instead, the requested data is destructively read out of the memory device, served to the memory reader, and the data placed into a temporary register within the virtualized memory controller. Then, in a subsequent clock cycle, the data in the temporary register is then written back into one of the memory banks (not necessarily the same location it was read from). In such an arrangement, the reason for the use of a destructive read operation is to improve memory read performance but to do so without actually losing the data. The destructively read data is not lost due to the write-back performed by the memory controller instead of the normal refresh performed within the DRAM device itself.

In the system of the present disclosure, the write-back of the data from the temporary register merely adds another write operation that needs to be performed in the subsequent clock cycle. However, as set forth in the previous section, the teachings of the present disclosure allow for multiple writes to be performed concurrently such that this write-back will not be seen from the perspective of the memory user. A first embodiment of a memory system that performs a single read operation (using fast destructive read) and simultaneous write operation is illustrated in FIGS. 10A to 10D.

FIG. 10A illustrates an initial starting condition of a memory system when a destructive read operation ($R_D$) for virtualized address 301 and a write operation to virtualized address 398 are received by the memory system. The memory system controller 1021 reads row 01 of the virtualized memory table 1023 to determine where virtualized address 301 currently resides (in row 01 of physical bank D) and quickly serves the data from virtualized address 301 with a destructive read operation. At this point, the data in row 01 of physical bank D is now invalid since the data was destroyed during the destructive read operation. However, the memory system controller 1021 will also keep a copy of the data that was read out and the virtualized address (301 in this example) in registers 1031 in memory system controller 1021 as depicted in FIG. 10B.

The simultaneously received write operation addressed to virtualized address 398 is handled in the same manner as described in the previous embodiments. In this example, there is a bank conflict with the read of virtual address 301 such that the write to virtualized address 398 is written to a different memory bank. The memory controller reads row 98 of the virtualized memory table 1023 to identify an available memory bank to store the data being written to virtualized address 398. In this example, the data written to virtualized address 398 is written to the physical memory location designated by row 98 of bank E and the virtualized memory table 1023 is updated with the new location of virtualized address 398 accordingly. The final state after the read of virtualized address 301 and the write to virtualized address 398 is illustrated as depicted in FIG. 10B. Note that row 01 of the virtualized memory table 1023 now contains three available memory banks since one of the row 01 data elements (virtualized address 301) is temporarily stored in register 1031 in the memory system controller 1021.

The data associated with virtualized address 301 temporarily stored in register 1031 needs to be written back to the physical memory array. Thus, a write-back is handled as a second write operation in a subsequent cycle. FIG. 10C illustrates the state of FIG. 10B wherein a new destructive read (from virtualized address 303) and a new write operation (to virtualized address 300) have been received. In addition to those two memory operations, the write-back of the data associated with virtualized address 301 temporarily stored within register 1031 must also be performed as illustrated. All three memory operations will be handled as follows.

Since the data to be read out is only available in the one location, the destructive read from virtualized address 303 takes priority. Thus the memory system controller 1021 locates the data for virtualized address 303, performs the destructive read operation, serves the data to the memory reader, and maintains a copy of the destructively read data (and virtualized address) within another register 1032 of memory system controller 1021. The write operations to address 300 and 301 are handled in the same manner set forth in the previous sections. Since there is a conflict with the D memory bank, the 00 and 01 rows are read out of the virtualized memory table 1023 to identify available memory banks. The 01 row of the virtualized memory table 1023 indicates that banks D, E, and F are all available but this is not the case since memory controller is currently accessing memory bank D for the destructive read of virtualized address 303. Thus, the data for the write-back of virtualized address 301 is put into row 01 of bank E. The 00 row of the virtualized memory table 1023 indicates that memory banks E and F are available, but since the write-back of address 301 is using bank E, that leaves bank F as the remaining free bank such that the memory system controller 1021 writes the data for virtualized address 300 into row 00 of bank F. The final state of the virtual memory system after the destructive read of address 303, the write to address 00, and the write-back of the previously destructive read data from address 301 is illustrated in FIG. 10D.

For simplicity, the destructive read example set forth in FIGS. 10A to 10D operates on an entire row of a memory bank. However, in most actual implementations, only a subset of a particular row will be destructively read out of the memory matrix. The remaining data in that memory row will not be affected. In this manner, the data paths from the memory bank to the memory controller do not have to be very wide. In such an embodiment, the virtualized memory table would also need to be segmented in the same manner as the memory rows as depicted in FIG. 8.

Even Greater Performance Gains Using Destructive Reads

Destructive read operations can be performed very quickly within a DRAM memory device. In fact, in some memory circuit designs, a destructive read operation can be performed twice as fast as a write operation (or a normal read operation which includes a write-back). Since the teachings of the present disclosure allow multiple additional writes to be performed in a memory cycle, write-backs of destructively read data can be performed concurrently with other operations. If the clock rate for the memory system is allowed to run twice as fast as the clock rate for an entity using the memory system, then a memory system can be constructed that handles two simultaneously read operations along with additional write operations without ever stalling due to a memory bank conflict.

In the example system that will be presented, it will be assumed that a destructive memory read operation can be performed in 2 nanoseconds (ns) and a memory write operation requires 4 ns. With such a memory circuit, a memory system clock cycle that is 2 ns long will allow for a single destructive read operation but two cycles will be required to perform a write operation. If an entity that uses the memory system runs with a clock cycle that is running half as fast (a clock cycle that is at least 4 ns long), then that entity will be able to concurrently issue two destructive read operations and multiple write operations to the memory system. The two destructive read operations will be performed within the memory system in consecutive clock cycles at the faster memory system clock speed. The write operations will require two clock cycles at the faster memory system clock speed but this is only one cycle for the memory user. And since the teachings of the present disclosure allow for multiple write operations, all of the write operations can be performed concurrently in a single clock cycle from the perspective of the memory user.

FIG. 11A illustrates an initial state for a memory system that can perform two read operations and one write operation simultaneously. Although this example only discusses a single write operation in addition to the two read operations, additional multiple additional write operations can easily be handled by adding additional memory banks as needed as set forth in previous sections of this document. For example, an implementation with two reads and two writes would provide a nice symmetric functionality. In the example of FIG. 11A, the memory system receives a write to address 399, a read from address 301, and a read from address 304.

Again, the read operations must take priority since the data can only be read from where the data is currently stored. In this example, both of the read operations are directed toward data stored within bank D since both address 301 and 304 currently reside within memory bank D. Normally this would cause a bank conflict. However, since the memory system clock is running at least twice the rate of the memory user and very fast destructive read operations are being performed, the two read operations may be performed consecutively within the memory system and appear as simultaneous to the memory user. Thus, both address 301 and 304 can be read in a single clock cycle from the perspective of the memory user.

The write operation to address 399 is also directed to a virtualized address that is currently represented within memory bank D. To avoid a memory bank conflict with the read operations, the memory system controller 1121 consults the 99 row of the virtualized memory table 1123 to locate an available memory bank in which to write the data for virtualized address 399. The 99 row of the virtualized memory table 1123 indicates that memory banks E, F, and G are available such that the memory system controller 1121 writes the data for address 399 into the 99 row of bank E and updates the virtualized memory table 1123 accordingly. FIG. 11B illustrates the state of the memory system after the read from address 301, the read from address 304, and the write to address 399. The data from the destructive read operations of addresses 301 and 304 results in having the data from those reads reside in temporary registers 1131 and 1132, respectively.

Figures 11C, 11D:
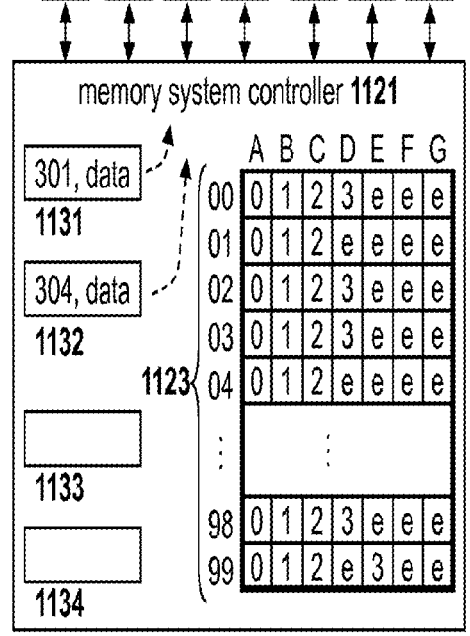
FIG. 11C illustrates the virtualized memory system of FIG. 11B receiving two additional destructive read operations and a write operation.
FIG. 11D illustrates the state of the virtualized memory system of FIG. 11C after performing the two destructive read operations and the single write operation.

In subsequent memory cycles, the memory system controller 1121 needs to handle the write-backs from the destructive read operations. Thus, the data from the destructive read operations of addresses 301 and 304 currently residing in temporary registers 1131 and 1132 must be written back into the physical memory array. However, these write-backs must be performed while continuing to handle additional memory access requests in those subsequent cycles. FIG. 11C illustrates the memory system with the state from FIG. 11B wherein a new write operation to address 398, a read from address 300, and a read from address 302 have been received. In addition to these three memory options, the memory system controller must also handle the write-backs from temporary registers 1131 and 1132 due to the previous destructive read operations.

The memory system controller 1121 reads the virtualized memory table 1123 to locate the current position of virtualized address 300 and virtualized address 302 for the read operation. Both addresses reside within memory bank D but memory system controller 1121 will be able to handle both destructive read operations from memory bank D without a memory bank conflict by accessing memory bank D with destructive read operations in consecutive fast memory system cycles. The data from those destructive reads will be served to the memory user and stored in temporary registers 1133 and 1134 for later write-back into the physical memory system. The memory system controller 1121 will update the virtualized memory table 1123 to reflect that memory addresses 300 and 302 no longer reside anywhere in the physical memory array due to the destructive read operations.

In addition to the two read operations, the memory system controller 1121 must simultaneously handle three write operations: the write-back of the address 301 data in register 1131, the write-back of the address 304 data in register 1132, and the new write of data to address 398. Consulting the virtualized memory table 1123, it can be seen that the two write-back data values are not in the physical memory (since those data values are in registers 1131 and 1131) and that the current location of virtual address 398 is in memory bank D that is busy with the read operations. Since the memory system controller 1121 is already reading from memory bank D with the memory reads, the memory system controller 1121 cannot write to memory bank D. Instead, the memory system controller 1121 must consult the virtualized memory table 1123 and write these data items to memory banks other than memory bank D (due to the conflict with the read operations) and a different memory bank for each write operation. In this example, the write-back to address 301 will use memory bank E, the write-back to address 304 will used memory bank F, and the write to address 398 will use memory bank G. Note that the memory system controller 1121 will perform the consecutive reads from memory bank D and the writes to memory banks E, F, and G concurrently without a memory bank conflict.

The final state of the physical memory and the virtualized memory table 1123 is illustrated in FIG. 11D. As depicted in FIG. 11D, the various virtualized addresses will move about within the physical memory system in order to avoid memory bank conflicts, but the current position of each virtualized memory address location can be determine by examining the temporary registers (1131, 1132, 1133, and 1134) and the virtualized memory table 1123.

As set forth with the previous example, the use of very fast destructive read operations can be used to perform consecutive read operations within a single clock cycle of device that operates at half the clock speed of the memory system. When combining those two high-speed read operations along with two write-back operations (to handle previous destructive reads) and any additional number of write operations, the memory system of FIGS. 11A to 11D allows destructive read operations to form the basis of a high-speed memory system that can handle two reads and multiple additional rights from the perspective of an entity that uses the memory system.

Read/Modify/Write Operations

A common memory operation that must be performed in many applications is a read, modify, and write operation. A processor reads a data value from memory, modifies the data value, and then writes the data back to memory. This type of operation is performed for all different types statistics counters maintained by various applications such as network equipment and data acquisition systems.

The techniques of the present disclosure can be used to implement efficient memory for read/modify/write ($R_{MW}$ as depicted in the drawings) operations. Read/modify/write operations can be handled very similar to the Read and Write system disclosed in FIGS. 7A to 7D. A principle difference is that a read, modify, write system can be implemented in a more efficient manner since the memory system knows that a write operation to the same address as the previous read operation will shortly follow after read operation.

Such a read/write/modify memory system will often be implemented with a separate read port and a separate write port. The systems are implemented in a pipeline manner where in after n clock cycles the corresponding write operation is received. In the following examples, the write operations are illustrated as being received one clock cycle after the initial read to reduce the complexity for illustration. However, the write may be received any (within reason) number of cycles after the read operation. Since the write will be received on a separate port a fixed number of cycles after a read operation, no address needs to be specified with the write operation since the memory system already knows exactly which data item is scheduled for update next.

Figure 12A:
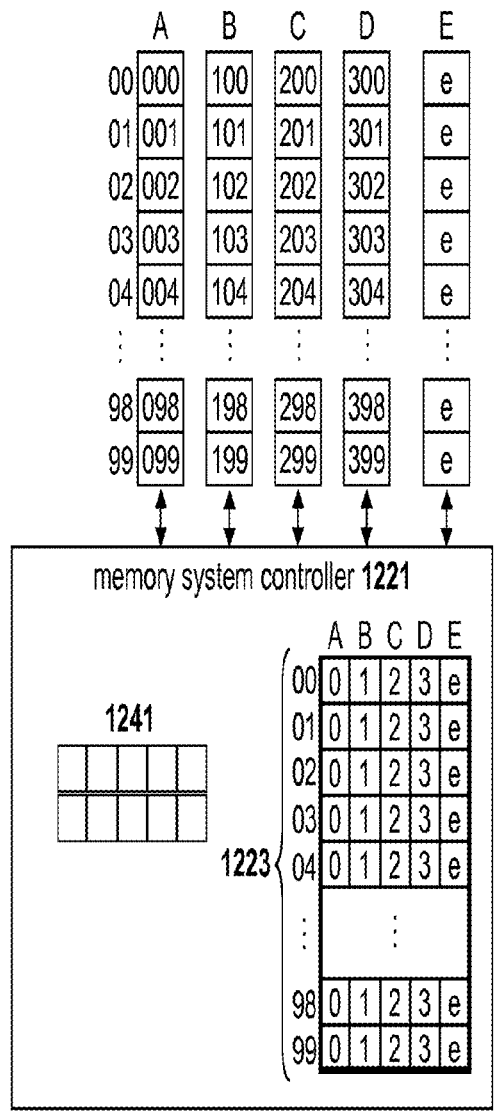
FIG. 12A illustrates an initial starting state of a virtualized memory system receiving simultaneous write and read operations wherein write-backs are optimized.
Figure 12B:
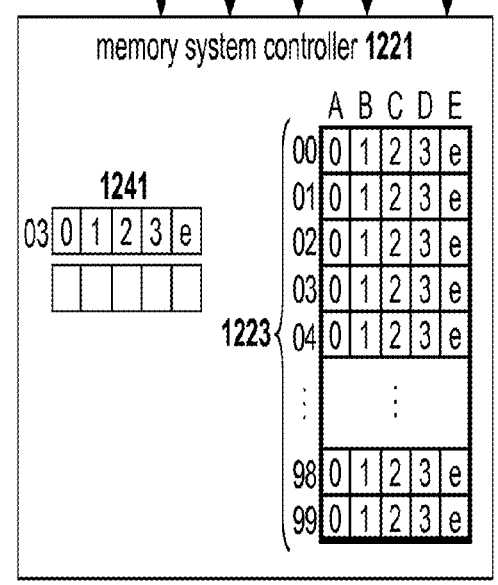
FIG. 12B illustrates the state of the virtualized memory system of FIG. 12A after processing a read operation that may be followed by a write-back operation.

Referring to FIG. 12A, an initial read, modify, write operation to virtualized address 103 is received. The virtual memory system controller 1221 reads out the contents of the 03 row in the virtualized memory table 1223 to locate virtualized address 103 and serves the data to the memory user. In addition, the virtual memory system controller 1221 stores a copy of the 03 row that was read out of virtualized memory table 1223 into a register 1241. FIG. 12B illustrates the final state after the initial $R_{MW}$ operation. No changes to the physical memory or virtualized memory table 1223 have occurred since no write operation occurred.

FIG. 12C illustrates the state of FIG. 12B when subsequent read, modify, and write operation (to address 301) is received by virtual memory system controller 1221. The virtual memory system controller 1221 reads out the contents of the 01 row in the virtualized memory table 1223 to locate virtualized address 301 and serves the data to the memory user. In addition, the virtual memory system controller 1221 stores a copy of the 01 row that was read out of virtualized memory table 1223 into register 1241 while advancing the previous 03 row to a subsequent row of that register. During this processing time, the memory user is modifying the 103 location that was read in the previous cycle. FIG. 12B illustrates the final state after the $R_{MW}(301)$ operation. Again, note that no changes to the physical memory or virtualized memory table 1223 have occurred since no write operation occurred yet.

FIG. 12E illustrates the state of FIG. 12D when subsequent read, modify, and write operation (to address 101) is received by virtual memory system controller 1221. In addition, the write corresponding to the $R_{MW}(103)$ operation in FIG. 12A has now been received. The memory system controller 1221 reads out the contents of the 01 row in the virtualized memory table 1223 to locate virtualized address 101 and serves the data to the memory user. The virtual memory system controller 1221 also stores a copy of the 01 row that was read out of virtualized memory table 1223 into register 1241 while advancing the previous 01 row to a subsequent row of that register. The 03 row from register 1241 is now used to handle the write to 103 that has been received. Note that by using the 03 row from register 1241, there is one fewer read into virtualized memory table 1223 thus reducing the load on virtualized memory table 1223. Using the 03 row from register 1241, the memory system controller 1221 determines that memory bank E is free (memory bank B that previously held virtualized address 103 cannot be used due to the conflict with the read to location 101). Thus, memory system controller 1221 stores the data associated with the write-back to virtualized address 103 into row 03 of bank E. FIG. 12F illustrates the final state after the write 103 and $R_{MW}(101)$ operations.

To prevent writing back an incorrect location, the memory system controller 1221 must detect when there is a write-back to a row of the virtualized memory table 1223 that is also represented in register 1241. Such situations are detected and the row in the register 1241 must also be updated. An example is provided with reference to FIGS. 12F to 12G.

Referring to FIG. 12F, it can be seen that there are two instances of row 01 in register 1241. This is fine as long as the real row 01 in the virtualized memory table 1223 does not change. FIG. 12G illustrates the state of FIG. 12F when receiving a read, modify, write operation to virtualized address 399 and a write-back address 301 from the earlier $R_{MW}(301)$ operation. As usual, the read takes priority such at memory system controller 1221 consults row 99 of the virtualized memory table 1223 to locate virtualized address 399 and serve that data to the memory user. Row 99 is then written into register 1241 to handle the later write-back and the 01 row from the $R_{MW}(101)$ operation is advanced. The write back of 301 is then handled using the 01 row from register 1241 that was associated with the $R_{MW}(301)$ operation. Since there is a conflict with the current read from virtual address 399 in bank D, the memory system controller 1221 must write back to the alternate free location in memory bank E. Thus, memory system controller 1221 writes data for the virtual address 301 write-back into the 01 row of memory bank E and updates the virtualized memory table 1223. However, since the virtualized memory table row 01 is also still represented in register 1241, the 01 row in register 1241 must also be updated. Thus, the 01 row in register 1241 is also updated to reflect the new location of virtualized address 301 and, more importantly, the new empty location in memory bank D.

Using Destructive Reads with a Read/Modify/Write Memory System

Read, Modify, and Write memory operations are very common memory operations for various computer applications. For example, any application that maintains a set of statistics counters will need to read a counter from memory, adjust that counter as needed, and then write that counter back into memory each time that counter needs to be changed. Such read, modify, and write operations are so common that dedicated memory systems that perform such read/modify/write operations in a highly efficient manner are in demand.

As set forth in the earlier sections on destructive read operations, a DRAM memory device may operate significantly faster if the condition of requiring data to be kept within the memory system after a read operation is eliminated. Specifically, destructive read operations wherein the data in a memory device is read out but destroyed during the process can be performed very quickly by memory devices. Since a read, modify, write cycle does not need the data to be maintained within a memory system after the initial read operation (since modified data will be written back into the memory), a read/modify/write memory system can take advantage of destructive read operations in order to construct a very efficient read/modify/write memory system. Such a dedicated read/modify/write memory system would always be able to use destructive reads since data never needs to be maintained in the memory system after a read operation.

The teachings of the previous section on a read/modify/write memory system may be combined with the earlier sections on creating a memory system using destructive read operations to create a very efficient read/modify/write memory system. Using the highspeed destructive read operations, the read/modify/write memory system will be able to process two simultaneous read/modify/write read operations along with two simultaneous follow-up write operations for previous read/modify/write read operations.

Figure 13A:
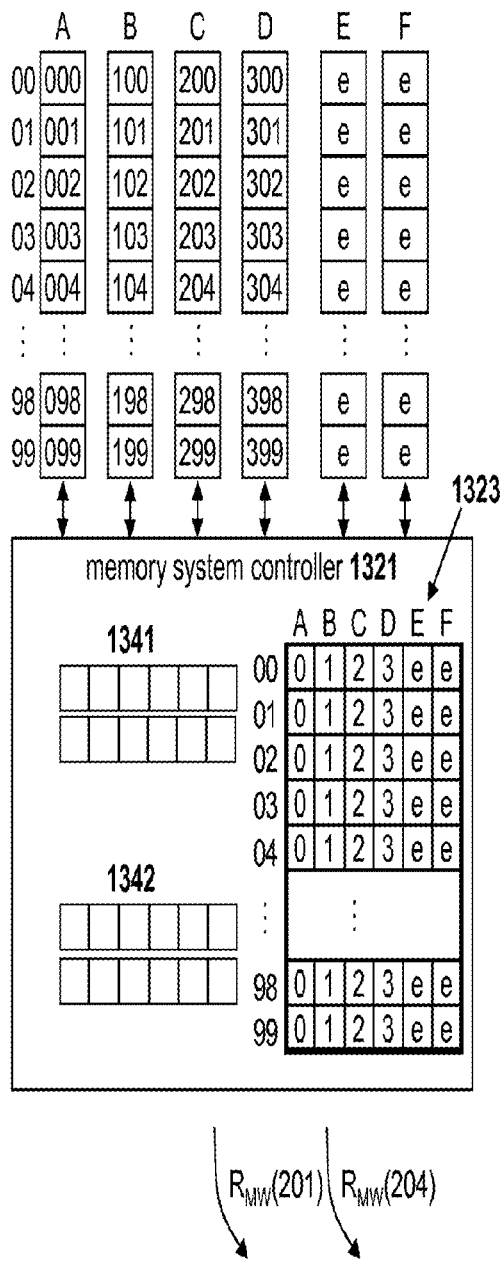
FIG. 13A illustrates an initial starting state of a virtualized memory system that can handle two read/modify/write operations simultaneously by using fast destructive read operations.
Figure 13B:
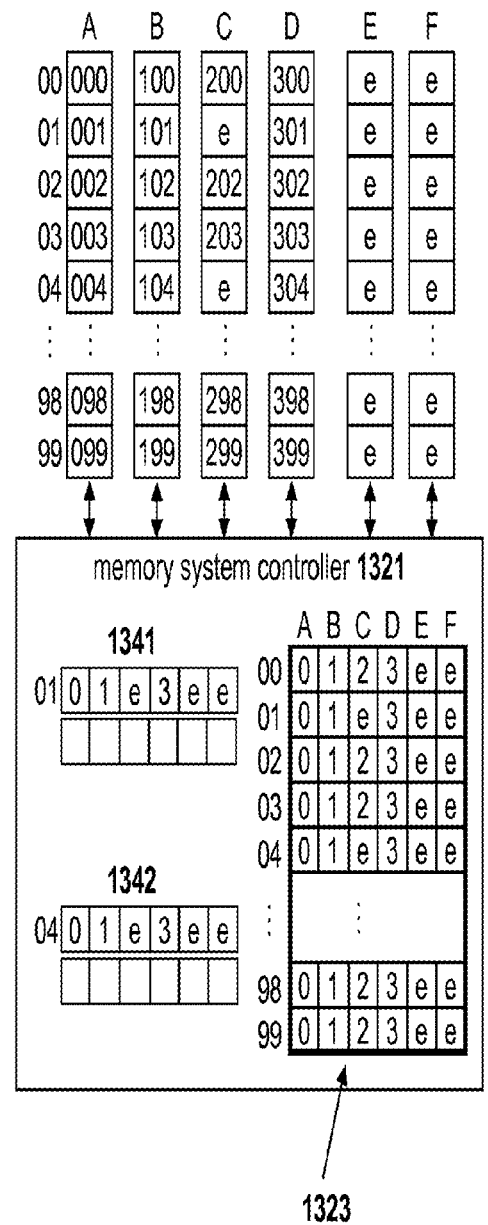
FIG. 13B illustrates the state of the virtualized memory system of FIG. 13A after handing the initial read of the two read/modify/write operations.

FIG. 13A illustrates an initial starting condition for a dedicated read/modify/write memory system that can handle two simultaneous read operations for a read/modify/write along with simultaneous write-back operations for earlier read operations. Two read operations as part of a read/modify/write cycle (depicted as Rmw in FIG. 13A) are simultaneously received by the memory system: a first read/modify/write read operation to virtualized address 20] and a second read/modify/write read operation to virtualized address 204. The memory system controller 1321 reads the appropriate rows (01 and 04) out of the virtualized memory table 1323 to determine the current locations of addresses 201 and 204, reads the data with destructive reads, and serves the data to the memory user that requested the data. The address locations that were read from now contain invalid data due to the destructive read. In preparation for the eventually writebacks, the rows (01 and 04) that were read out from the virtualized memory table 1323 are placed into registers 1341 and 1342, respectively. The final state after the read/write/modify operations of FIG. 13A is illustrated in FIG. 13B.

Figure 13C:
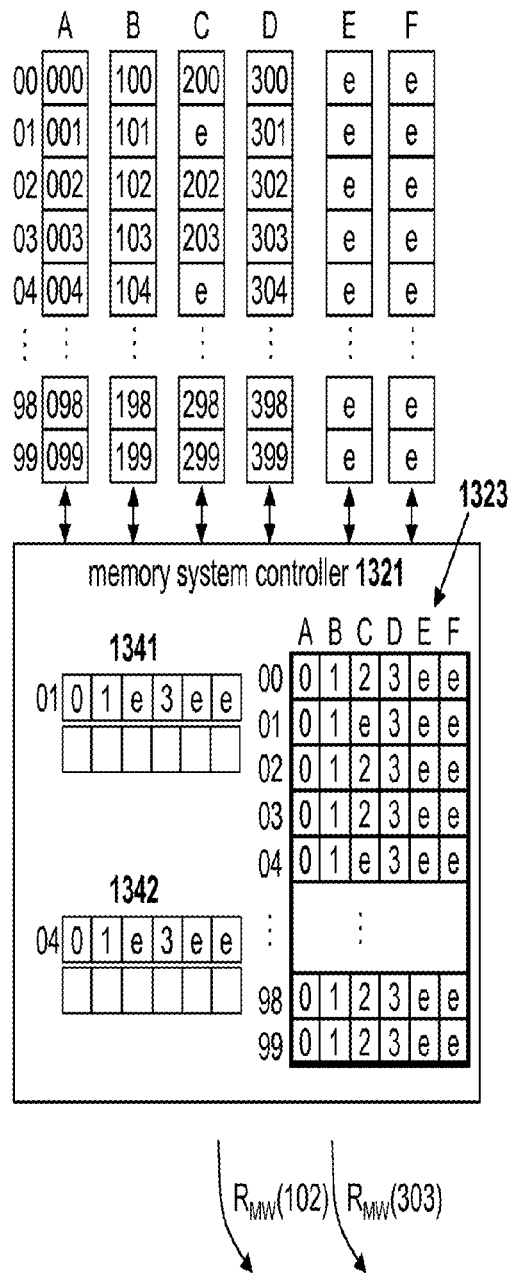
FIG. 13C illustrates the virtualized memory system of FIG. 13B receiving two additional read/modify/write operations.
Figure 13D:
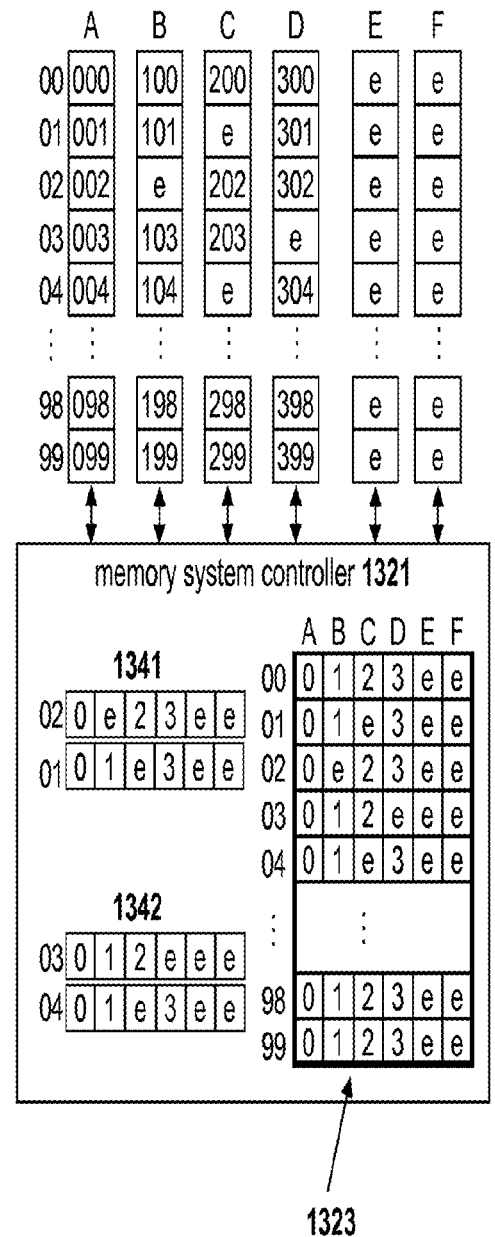
FIG. 13D illustrates the state of the virtualized memory system of FIG. 13C after handing the initial read of the two read/modify/write operations of FIG. 13C.

In a subsequent clock cycle, additional read/modify/write read operations are received as illustrated in FIG. 13C. FIG. 13C starts with the state of FIG. 13B and then receives read/modify/write read operations for virtualized addresses 102 and 303. Again, the memory system controller 1321 reads the appropriate rows (02 and 03) out of the virtualized memory table 1323 to determine the current locations of virtualized addresses 102 and 303, reads the data with destructive reads, and serves the data to the memory user that requested the data. Similarly, in preparation for the eventually write-backs, the rows (02 and 03) that were read out from the virtualized memory table 1323 are placed into registers 1341 and 1342, respectively. The 01 and 04 rows that were written into registers 1341 and 1342 are advanced to a next position in those registers, ready to handle a write-back. The memory user that read the data from address 201 and 204 is currently modifying that data and will write back that data in a subsequent clock cycle. The final state after the read/write/modify operations of FIG. 13C is illustrated in FIG. 13D.

In a subsequent clock cycle, the memory user is now writing back the modified data for addresses 201 and 204 that were read back in FIG. 13A. Thus, FIG. 13E illustrates two write operations for addresses 201 and 204 along with two new read/modify/write read operations. One again, the memory system controller 1321 reads the appropriate rows (03 and 01) out of the virtualized memory table 1323 to determine the current locations of virtualized addresses 103 and 101, reads the data with destructive reads, and serves the data to the memory user that requested the data. Once again, in preparation for the eventually write-backs to address 103 and 101, the virtualized memory table 1323 rows (02 and 01) that were read out will be placed into registers 1341 and 1342, respectively.

The write-backs for the 201 and 204 addresses may be handled using the row data in the bottom part of registers 1341 and 1342. The modified data for virtualized address 201 may be written back to its original location in memory bank C since the two read operations both read from memory bank B (in consecutive fast destructive read operations). The modified data for virtualized address 204 cannot be written back to its original location due to the write into bank C for virtual address 201 and thus will be written to memory bank E. The final state after the read/write/modify operations of FIG. 13F is illustrated in FIG. 13D. Note that additional write operations may be allowed by simply adding additional memory banks to prevent memory bank conflicts.

In the embodiment illustrated in FIGS. 13A to 13E, the destructive read data is lost since the system is designed to always expect a subsequent write-back from the memory user. In an alternate embodiment, the system can be constructed to make the write-backs from the memory user optional. The data destructive read from the memory matrix can be carried along with the row from the virtualized memory table data 1323 in registers 1341 and 1342. In such an embodiment, the memory controller 1321 will write-back the data carried in registers 1341 and 1342 if no subsequent write-back request is received from the user of the memory system.

Reducing Table Data and Word Enable

In the virtualized state table of the present disclosure, each row specifies a single least significant set of bits and each entry must contain a number of bits that when added to the number of bits used to specify a row equals the number of bits for a full memory address. The size of the virtualized memory table and number of bits in each entry required to implement a virtualized memory table is thus reasonably large. It would be desirable to reduce the size of virtualized memory table or the amount of information that needs to be stored within the virtualized memory table to simplify the implementation of a memory system that uses the teachings of the present disclosure.

One way to reduce the size of the virtualized address table is to have each row represent more than a single version of least significant bits. Similarly, the amount of bits in the virtualized memory table may be reduced by having each data entry in the physical memory system represent more than a single set of most significant bits. In this manner, when a particular virtualized address is accessed by combining the entry from the virtualized address table with the bits from the row designation, the address is not complete and thus specifies a group of data elements instead of a specific data element. Thus, each data entry in the virtualized memory table and the physical memory represents a group of virtualized addresses instead of a single virtualized address. When the address specified by the virtualized memory table is accessed, a group of data elements will be retrieved instead of a single data element at a single virtualized address.

With such an implementation, the data entry from the physical memory would always need to be treated as a single group since there is only one pointer in the virtualized memory table that specifies where that grouped of virtualized addresses is located in the physical memory. If the data from the group were split up, there would be no way to locate the individual different data items. To ensure that the data is always treated as a unified group, the system can only be implemented as a read/modify/write type of system wherein the contents of a data entry are read from the physical memory and then stored in a register in the memory controller until a subsequent write operation is received. In this manner, the different data items within a single grouped entry are always kept together as a group.

Figure 14A:
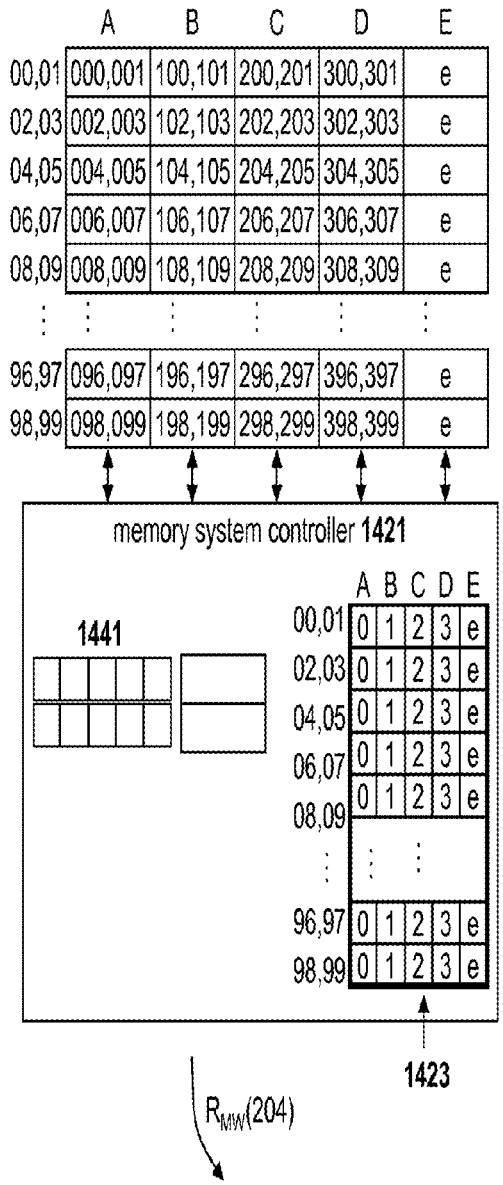
FIG. 14A illustrates an initial starting state of a virtualized memory system that groups together individual data elements that will be handled as a group although individually addressable.

FIG. 14A illustrates an initial state condition of an example read/modify/write memory system wherein the size of the virtualized memory table is reduced by grouping together two different virtualized addresses in each row of the virtualized memory table. Specifically, the virtualized memory table of FIG. 14A has half the number of rows since each row represents two different least significant sets of bits.

In an alternative embodiment, there would be a single set of least significant bits for each row but each entry in the virtualized memory table would represent more than a single set of higher order bits. Furthermore, these two methods for reducing the virtualized memory table can be used simultaneously. For example, each row could designate two different least significant bit patterns and each entry could represent two different most significant bit patterns such that each entry in the virtualized memory table (and the physical memory) would represent four different individually addressable (from the memory user's perspective) data elements. The entire group of four elements would be read as a single group, but individual data elements from the group may be supplied to the memory user and modified.

Figure 14B:
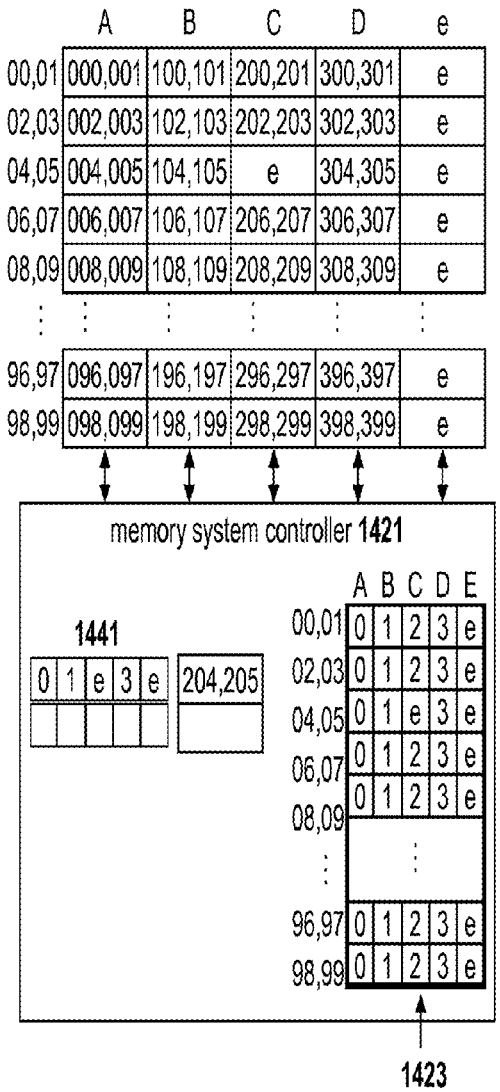
FIG. 14B illustrates the state of the virtualized memory system of FIG. 14A after handing the initial read of a read/modify/write operation.

In the example of FIG. 14A, a first read/modify/write operation has been received that reads from virtualized address 204. The memory controller 1421 reads the 04,05 row from the virtualized memory table 1423 to determine that virtualized address 204 resides in row 04,05 of the C memory bank. The memory controller 1421 reads this packed data entry out of the physical memory array, serves the data from virtualized address 204 to the memory user, and places the 04,05 memory table row and the data 204,205 data into the register 1441. The final state after this operation is illustrated in FIG. 14B.

Figure 14C:
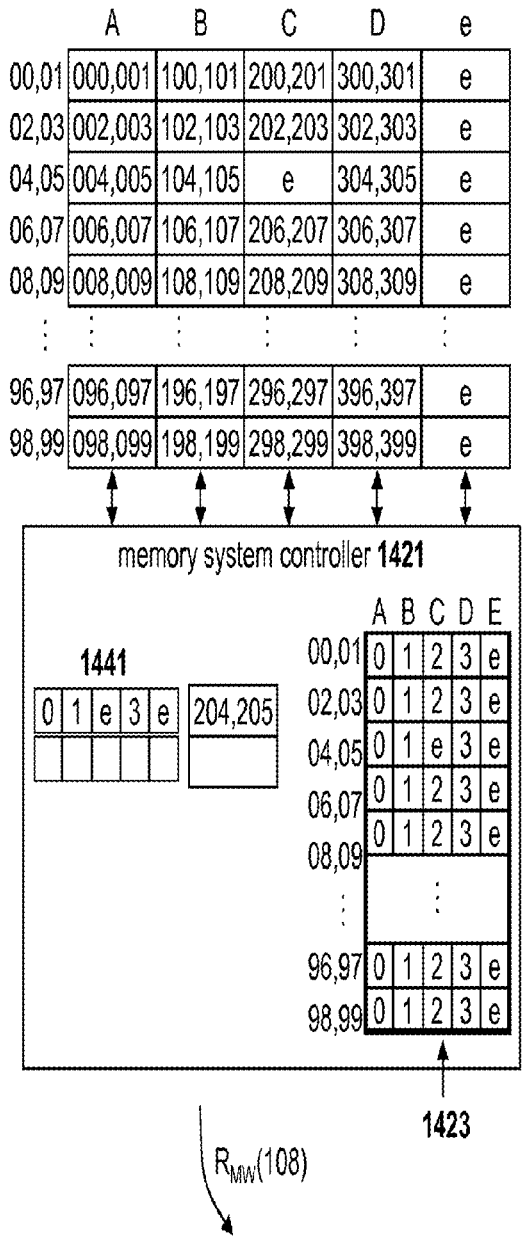
FIG. 14C illustrates the virtualized memory system of FIG. 14B receiving another initial read of a read/modify/write operation.
Figure 14D:
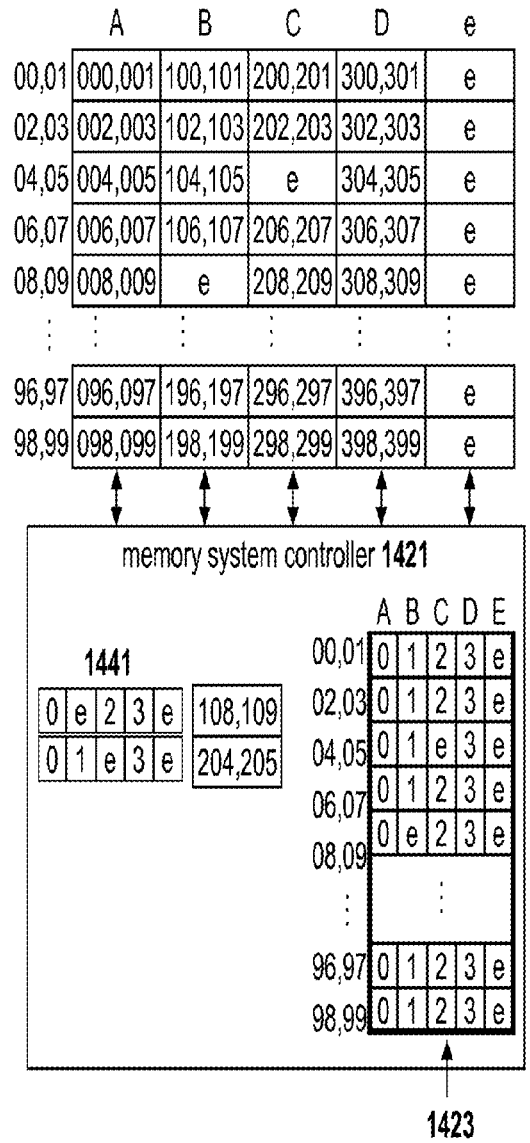
FIG. 14D illustrates the state of the virtualized memory system of FIG. 14C after handing the read of a read/modify/write operation from FIG. 14C.

Next, in FIG. 14C, system receives another read/modify/write read operation to address 108. Again, the memory controller 1421 access the virtualized memory table (row 08, 09) to determine that virtualized address 108 resides in row 08,09 of the B memory bank. Thus, the memory controller 1421 reads this packed data entry out of the physical memory array, serves the data from virtualized address 108 to the memory user, and places the 08,09 memory table row and the data 108,109 data into the register 1441. The 204,205 entry is moved down to the next position. The final state after this operation is illustrated in FIG. 14D.

Figure 14E:
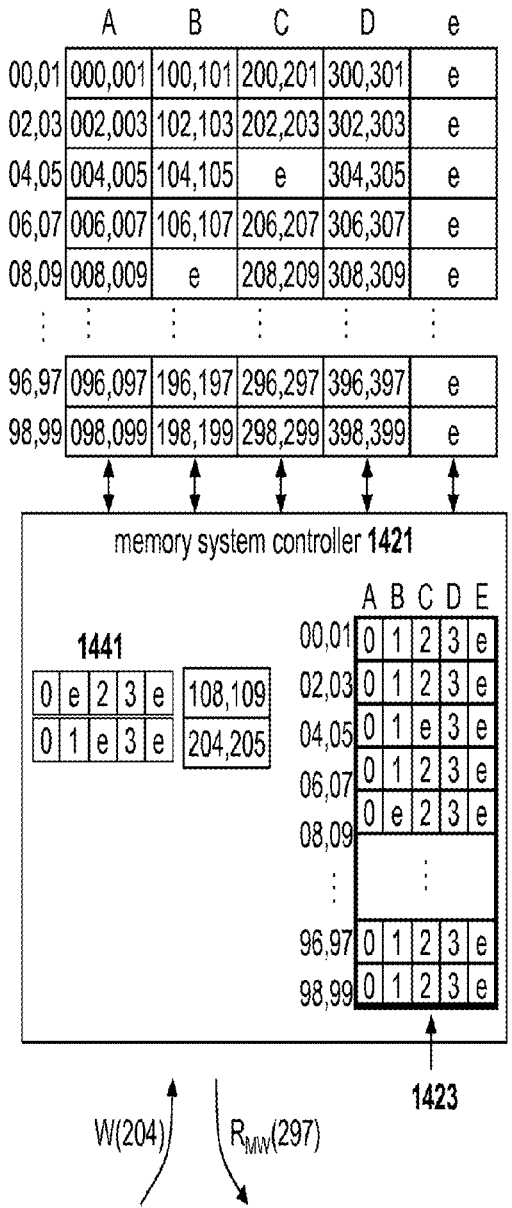
FIG. 14E illustrates the virtualized memory system of FIG. 14D receiving another initial read of a read/modify/write operation and a write-back associated with the read operation of FIG. 14A.
Figure 14F:
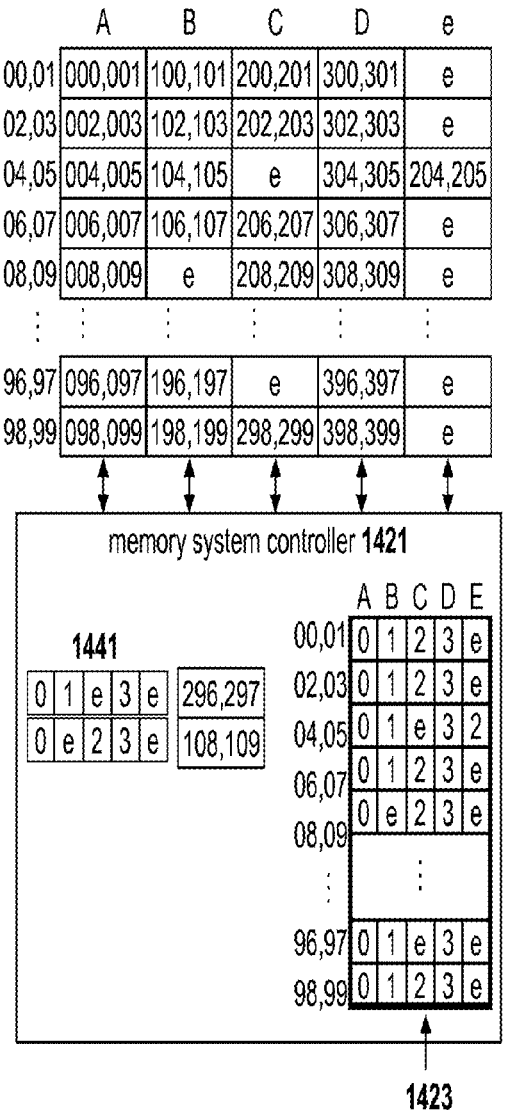
FIG. 14F illustrates the state of the virtualized memory system of FIG. 14E after handing the read of a read/modify/write operation and the write-back from FIG. 14E.

In FIG. 14E, the write-back for virtualized address 204 is received along with another read/modify/write read operation to virtualized address 297. The read/modify/write read operation takes priority such that the memory controller 1421 first accesses the virtualized memory table (row 96,97) to determine that virtualized address 297 resides in row 96,97 of the C memory bank. Thus, the memory controller 1421 reads this packed data entry out of the physical memory array, serves the data from virtualized address 297 to the memory user, and will place the 96,97 memory table row and the data 296,297 data into the register 1441. The data from the write-back to virtualized address 204 is used to update the packed 204, 205 entry from register 1441 and then is written back into the physical memory system. The original entry for 204,205 cannot be used since the reading of the virtualized address 297 data is already using the C memory bank. Thus, the memory controller writes the packed 204,205 entry to the other free memory bank as indicated by the row 04,05 data, memory bank E. FIG. 14F illustrates the final state after the write-back of the 204 data as a packed 204,205 unit.

Figure 15:
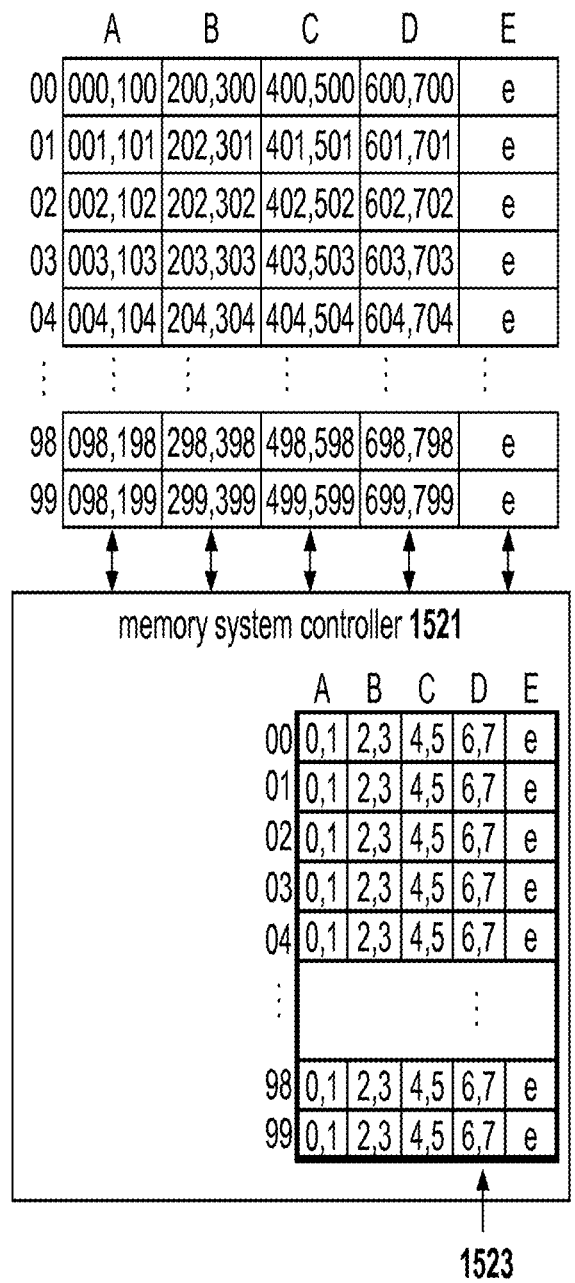
FIG. 15 illustrates a virtualized memory system that groups together individual data elements that will be handled as a group by indicating more than one set of most significant bits in the virtualized memory table.

As set forth earlier, the techniques of FIGS. 14A to 14F can also be implemented with a system that uses a single set of least significant bits for each row in the virtualized address table (and the physical memory) but a set of most significant bits within each virtualized table entry that specifies more than one data entry each having slightly different most significant bits. For example, FIG. 15 illustrates a conceptual diagram wherein each element with the virtualized memory table 1423 specifies two different virtualized addresses. (Note that although the two digits in the virtualized memory table illustrated in FIG. 15 makes the drawing look physically larger, in an implementation, a single least significant bit would be removed to represent two grouped values and thus physical table would actually be smaller.) In the example of FIG. 15, by grouping together two data elements, twice as many virtualized addresses are represented by the virtualized address table (000 to 799 instead of just 000 to 399 as presented in the earlier examples.

The teachings of FIGS. 14A to 14F and 15 can also be used to implement a "Word Enable" system wherein only a portion of an individually addressable data element can be modified. For example, many processors allow instructions that allow for a subset of an individually addressable data element (such as the least or most significant bits half). This technique is known as "word enable" and the upper or lower word may be specified by an upper half or lower half lines that are normally kept high (indicating that both upper and lower half should be accessed as normal).

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of handling memory read requests in a digital memory system, said method comprising:
    receiving a first memory read request for a requested data item, said first memory read request identifying a first virtualized memory address in a virtualized memory address space;
    translating said first virtualized memory address into a first physical memory address;
    executing said first memory read request with a physical memory system using the first physical memory address, by reading a first data word from the first physical memory address;
    simultaneously receiving a first memory write request with a second data word along with the first memory read request, the first memory write request identifying a second virtual memory address in the virtual memory address space;
    translating the second virtualized memory address into a second physical memory address; and
    writing the second data word to the second physical memory address when a write to the second physical memory address currently associated with the second virtualized memory address does not cause a memory bank conflict with the reading of the first data word from the first physical memory address;
    writing the second data word to a third physical memory address when the second physical memory address currently associated with the second virtualized memory address causes a memory bank conflict with the reading of the first data word from the first physical memory address; and
    updating a translation table to associate the third physical memory address with the second virtualized memory address when the second physical memory address currently causes a memory bank conflict with the reading of the first data word from the first physical memory address.

2. The method of claim 1, wherein the translating of the first virtualized memory address into the first physical memory address includes:
    accessing a translation table using as an index a first subset of the first virtualized memory address;
    identifying a first memory bank from a set of N memory banks that currently represents the first virtualized memory address; and
    generating the first physical memory address using the first memory bank and the first subset of the first virtualized memory address.

3. The method of claim 2, wherein the translation table has an equal number of rows as the set of N memory banks.

4. The method of claim 2, wherein the entries in the translation table store a second subset of the first virtualized memory address.

5. The method of claim 1, further comprising:
simultaneously receiving a second memory write request with a third data word along with the first memory read request and the first memory write request, the second memory write request identifying a fourth virtualized memory address in the virtualized memory address space;
translating the fourth virtualized memory address into a fourth physical memory address;
writing the third data word to the fourth physical memory address if writing to the fourth physical memory address associated with the fourth virtualized memory address does not cause a memory bank conflict with either the first memory read request or the first memory write request.

6. The method of claim 5, further comprising:
writing the third data word to a fifth physical memory address when the fourth physical memory address currently associated with the fourth virtualized memory address would cause a memory bank conflict with the reading of the first data word from the first physical address or the writing of the second data word to the second physical memory address.

7. The method of claim 6, further comprising:
updating the translation tale to associate the fifth physical memory address with the fourth virtualized memory address when the fourth physical memory address causes a memory bank conflict with the reading of a first data word from the first physical memory address or the writing of the second data word to the second physical memory address.

8. A digital memory system for handling memory access requests, said digital memory system comprising:
a set of N independent physical memory banks; and
a memory system controller, said memory system controller comprising
a translation table, and
control logic configured to:
translate virtualized memory addresses received in said memory access requests into physical memory addresses using said translation table,
execute a first read request by translating a first virtualized address into a first physical memory address in the set of N independent physical memory banks;
simultaneously receive a first write request with a second data word along with the first read request, the first write request identifying a second virtual memory address;
translate the second virtualized memory address into a second physical memory address; and
write the second data word to the second physical memory address when a write to the second physical memory address currently associated with the second virtualized memory address does not cause a memory bank conflict with the reading of the first data word from the first physical memory address;
write the second data word to a third physical memory address when the second physical memory address currently associated with the second virtualized memory address causes a memory bank conflict with the reading of the first data word from the first physical memory address; and
update the translation table to associate the third physical memory address with the second virtualized memory address when the second physical memory address currently causes a memory bank conflict with the reading of the first data word from the first physical memory address.

9. The digital memory system as set forth in claim 8, wherein said translation table is accessed using a first subset of the first virtualized memory address as an index and said translation table identifies a first memory bank from the set of N independent memory banks that currently represents said first virtualized memory address.

10. The digital memory system as set forth in claim 9, wherein said first subset of said first virtualized memory address and said first memory bank are used to construct the first physical memory address.

11. The digital memory system as set forth in claim 9, wherein said translation table has an equal number of rows as said set of N memory banks.

12. The digital memory system as set forth in claim 9, wherein entries in said translation table store a second subset of said first virtualized memory address.

13. The digital memory system as set forth in claim 8, wherein an address space for said physical memory addresses comprises the set of N independent memory banks and an address space for said virtualized memory addresses occupies a subset of said address space for the physical memory addresses.

14. The digital memory system as set forth in claim 8, wherein said control logic is configured to:
simultaneously execute the first read request to the first virtualized address in a first memory bank and the first write request to the second virtualized address by writing data associated with said first write request to a second memory bank and updating said translation table to associate said second virtualized address with said second memory bank.

15. The digital memory system as set forth in claim 14, wherein said control logic is configured to:
execute a second write request to a third virtualized address in said first memory bank received simultaneously with said first read request and said first write request to the second virtualized address by writing data associated with said second write request to a third memory bank and updating said translation table to associate said third virtualized address with said third memory bank.

16. The digital memory system as set forth in claim 8, said digital memory system further comprising:
a temporary register in said memory system controller, said temporary register configured to store a set of entries read from said the translation table upon receiving a read request to the first virtualized memory address,
wherein said control logic is configured to access said temporary register if a memory write request to said first virtualized memory address is temporally proximate to said read request to the first virtualized memory address.

* * * * *